US012569810B2

(12) United States Patent
Huennekes et al.

(10) Patent No.: US 12,569,810 B2
(45) Date of Patent: Mar. 10, 2026

(54) SELECTIVE CATALYTIC REDUCTION CATALYST AND A PROCESS FOR PREPARING A SELECTIVE CATALYTIC REDUCTION CATALYST

(71) Applicant: BASF MOBILE EMISSIONS CATALYSTS LLC, Iselin, NJ (US)

(72) Inventors: Edgar Viktor Huennekes, Hannover (DE); Nicholas Mcguire, Huntsville, AL (US); Petra Cordes, Wunstorf (DE); Kevin Beard, Iselin, NJ (US); Jan Martin Becker, Hannover (DE); John K Hochmuth, State College, NJ (US); Kenneth E Voss, Somerville, NJ (US); Joseph A Patchett, Iselin, NJ (US); Andreas R Munding, Huntsville, AL (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 314 days.

(21) Appl. No.: 17/906,265

(22) PCT Filed: Mar. 30, 2021

(86) PCT No.: PCT/EP2021/058331
§ 371 (c)(1),
(2) Date: Sep. 14, 2022

(87) PCT Pub. No.: WO2021/198276
PCT Pub. Date: Oct. 7, 2021

(65) Prior Publication Data
US 2023/0129815 A1        Apr. 27, 2023

(30) Foreign Application Priority Data

Mar. 30, 2020    (EP) .................................... 20166621

(51) Int. Cl.
B01D 53/94         (2006.01)
B01J 23/745        (2006.01)
(Continued)

(52) U.S. Cl.
CPC ........ B01D 53/9418 (2013.01); B01J 23/745 (2013.01); B01J 29/68 (2013.01);
(Continued)

(58) Field of Classification Search
CPC ...... B01D 53/9418; B01D 2255/20738; B01D 2255/20761; B01D 2255/50;
(Continued)

(56) References Cited

U.S. PATENT DOCUMENTS 5,409,671 A * 4/1995 Takemoto .......... B01D 53/9418
502/67
2004/0138052 A1* 7/2004 Van Rooijen ........ B01J 37/0246
423/239.2
2018/0339288 A1 11/2018 Petrovic

FOREIGN PATENT DOCUMENTS

JP      2017-518874 A      7/2017
WO      2015/187550 A2     12/2015
(Continued)

OTHER PUBLICATIONS

International Search Report dated Jun. 24, 2021, PCT/EP2021/058331.

*Primary Examiner* — Audrey B. Walter
(74) *Attorney, Agent, or Firm* — DLA Piper LLP (US)

(57) ABSTRACT
The present invention relates to a process for preparing a catalyst for the selective catalytic reduction of nitrogen oxide comprising, among other steps, preparing a second aqueous mixture comprising water and an iron salt; and disposing the second mixture on the substrate obtained according to (ii), comprising a coating comprising a zeolitic
(Continued)

material comprising copper, over y % of the substrate axial length from the inlet end to the outlet end of the substrate, wherein y is in the range of from 10 to x, obtaining a substrate comprising, in a first zone, the coating comprising a zeolitic material comprising copper and over y % of the substrate axial length an iron salt; and, if x>y, in a second zone extending from y % to x % of the substrate axial length from the inlet end to the outlet end, the coating comprising a zeolitic material comprising copper.

18 Claims, 9 Drawing Sheets

(51) Int. Cl.
| | |
|---|---|
| *B01J 29/68* | (2006.01) |
| *B01J 29/72* | (2006.01) |
| *B01J 35/77* | (2024.01) |
| *B01J 37/02* | (2006.01) |
| *F01N 3/20* | (2006.01) |

(52) U.S. Cl.
CPC ............. *B01J 29/72* (2013.01); *B01J 29/723* (2013.01); *B01J 37/0244* (2013.01); *B01J 37/0246* (2013.01); *F01N 3/2066* (2013.01); *B01D 2255/20738* (2013.01); *B01D 2255/20761* (2013.01); *B01D 2255/50* (2013.01); *B01D 2255/9032* (2013.01); *B01J 35/77* (2024.01); *B01J 2235/30* (2024.01)

(58) Field of Classification Search
CPC . B01D 2255/9032; B01J 23/745; B01J 29/68; B01J 29/72; B01J 29/723; B01J 37/0244; B01J 37/0246; F01N 3/2066
See application file for complete search history.

(56) References Cited

FOREIGN PATENT DOCUMENTS

| | | | |
|---|---|---|---|
| WO | WO-2017/153894 A1 | 9/2017 | |
| WO | WO-2018025244 A1 * | 2/2018 | ......... B01D 53/9418 |

* cited by examiner

SELECTIVE CATALYTIC REDUCTION CATALYST AND A PROCESS FOR PREPARING A SELECTIVE CATALYTIC REDUCTION CATALYST

This application is a national stage filing under 35 U.S.C. § 371 of International Application No. PCT/EP2021/058331, filed on Mar. 30, 2021, and claims priority to EP Application No. 20166621.17, filed Mar. 30, 2020; the disclosure of each of these applications are incorporated herein by reference in their entirety.

The present invention relates to a process for preparing a catalyst for the selective catalytic reduction of nitrogen oxide, a catalyst for the selective catalytic reduction (SCR) of nitrogen oxide, a use of said catalyst, a method for the SCR of NOx using said catalyst and an exhaust gas treatment system comprising said catalyst. The present invention further relates to an exhaust gas treatment catalyst, a process for preparing the same, a use of said catalyst and a method for the SCR of NOx and the oxidation of ammonia using said catalyst.

As a trend, the NOx engine out emissions of modern Heavy Duty Diesel Engines will increase due to the making of a more fuel efficient engine, and the more the NOx conversion requirements of after-treatment systems will increase. For some engines, NOx conversions of more than 95% are already mandatory. At the same time, it becomes more challenging to fulfill the nitrous oxide ($N_2O$) targets as these targets are in the range of 0.1 to 0.14 g/kWh. Therefore, SCR catalysts with high NOx conversion and moderate to low $N_2O$ formation (<0.1 g/kWh) appears to be mandatory to address the market requirements.

It is known that the combination of a Fe-zeolites and Cu-zeolites in one catalytic system can partially address this optimization requirements. For example, WO 2016/070090 A1 discloses a catalytic article comprising a first molecular sieve promoted with copper and a second molecular sieve promoted with iron. US 2011/0305614 A1 also discloses a catalyst, in particular a selective catalytic reduction (SCR) catalyst comprising a mixture of Cu-CHA and Fe-MFI. Finally, WO 2017/153894 A1 discloses a metal ion-exchanged molecular sieve which is ion-exchanged with at least one additional metal, such as a Cu-CHA further exchanged with other metals such as Al, Fe, Cu and Zr.

However, there is a need to provide a selective catalytic reduction catalyst which permits to reduce significantly the $N_2O$ emissions, while maintaining great NOx conversion level or even improving NOx conversion under both standard SCR and fast SCR gas feed conditions as well as process for preparing a selective catalytic reduction catalyst presenting such catalytic performances.

I. A Process for Preparing a Catalyst for the Selective Catalytic Reduction of Nitrogen Oxide and a Catalyst for the Selective Catalytic Reduction of Nitrogen Oxide It was surprisingly found that the process according to the present invention permits to provide a selective catalytic reduction catalyst according to the present invention which permits to reduce significantly the $N_2O$ emissions, while maintaining great NOx conversion level or even improving NOx conversion under both standard SCR and fast SCR gas feed conditions.

Therefore, the present invention relates to a process for preparing a catalyst for the selective catalytic reduction of nitrogen oxide comprising a coating comprising iron and a zeolitic material comprising copper, the process comprising
- (i) preparing a first aqueous mixture comprising water and a zeolitic material comprising copper;

- (ii) disposing the first aqueous mixture obtained according to (i) on the surface of the internal walls of a substrate comprising an inlet end, an outlet end, a substrate axial length extending from the inlet end to the outlet end and a plurality of passages defined by internal walls of the substrate extending therethrough, over x % of the substrate axial length from the inlet end to the outlet end of the substrate, wherein x is in the range of from 80 to 100; calcining the substrate having the first aqueous mixture disposed thereon, obtaining a substrate comprising a coating comprising a zeolitic material comprising copper;
- (iii) preparing a second aqueous mixture comprising water and an iron salt;
- (iv) disposing the second aqueous mixture obtained according to (iii) on the substrate obtained according to (ii) over y % of the substrate axial length from the inlet end to the outlet end of the substrate, wherein y is in the range of from 10 to x, obtaining a substrate comprising, in a first zone, the coating comprising over y % of the substrate axial length an iron salt and a zeolitic material comprising copper; and, if x>y, in a second zone extending from y % to x % of the substrate axial length from the inlet end to the outlet end, the coating comprising a zeolitic material comprising copper;
- (v) calcining the substrate obtained according to (iv).

In the context of the present invention, it is noted that it is conceivable that the disposal of the first aqueous mixture obtained according to (i) could be performed from the outlet end to the inlet end of the substrate, preferably when the first aqueous mixture is disposed over the entire length of the substrate.

It is preferred that the zeolitic material comprising copper contained in the first aqueous mixture prepared according to (i) has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof.

It is more preferred that the zeolitic material comprising copper contained in the first aqueous mixture prepared according to (i) has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI. It is more preferred that the zeolitic material comprising copper contained in the first aqueous mixture prepared according to (i) has a framework type CHA.

Alternatively, it is more preferred that the zeolitic material comprising copper contained in the first aqueous mixture prepared according to (i) has a framework type selected from the group consisting of FER, BEA, MFI, FAU, MOR, a mixture of two or more thereof and a mixed type of two or more thereof, more preferably selected from the group consisting of FER, BEA, MFI, FAU, a mixture of two or more thereof and a mixed type of two or more thereof. It is more preferred that the zeolitic material comprising copper contained in the first aqueous mixture prepared according to (i) has a framework type FER or BEA.

Therefore, the present invention preferably relates to a process for preparing a catalyst for the selective catalytic reduction of nitrogen oxide comprising a coating comprising iron and a zeolitic material comprising copper, the process comprising (i) preparing a first aqueous mixture comprising water and a zeolitic material comprising copper;

(ii) disposing the first aqueous mixture obtained according to (i) on the surface of the internal walls of a substrate comprising an inlet end, an outlet end, a substrate axial length extending from the inlet end to the outlet end and a plurality of passages defined by internal walls of the substrate extending therethrough, over x % of the substrate axial length from the inlet end to the outlet end of the substrate, wherein x is in the range of from 80 to 100; calcining the substrate having the first aqueous mixture disposed thereon, obtaining a substrate comprising a coating comprising a zeolitic material comprising copper;

(iii) preparing a second aqueous mixture comprising water and an iron salt;

(iv) disposing the second aqueous mixture obtained according to (iii) on the substrate obtained according to (ii) over y % of the substrate axial length from the inlet end to the outlet end of the substrate, wherein y is in the range of from 10 to x, obtaining a substrate comprising, in a first zone, the coating comprising a zeolitic material comprising copper and over y % of the substrate axial length an iron salt; and, if x>y, in a second zone extending from y % to x % of the substrate axial length from the inlet end to the outlet end, the coating comprising a zeolitic material comprising copper;

(v) calcining the substrate obtained according to (iv); wherein the zeolitic material contained in the first aqueous mixture prepared according to (i) has a framework type CHA. Alternatively, it is preferred that said zeolitic material contained in the first aqueous mixture prepared according to (i) has a framework type FER or BEA.

In the context of the present invention, it is preferred that from 95 to 100 weight-%, more preferably from 98 to 100 weight-%, more preferably from 99 to 100 weight-%, of the framework structure of the zeolitic material consist of Si, Al, O, and optionally H, wherein in the framework structure, the molar ratio of Si to Al, calculated as molar $SiO_2:Al_2O_3$, more preferably is in the range of from 2:1 to 50:1, more preferably in the range of from 5:1 to 45:1, more preferably in the range of from 7:1 to 35:1, more preferably in the range of from 10:1 to 30:1, more preferably in the range of from 15:1 to 22:1 or more preferably in the range of from 24:1 to 30:1.

It is more preferred that, when the zeolitic material contained in the first aqueous mixture prepared according to (i) has a framework type CHA or FER, the molar ratio of Si to Al, calculated as molar $SiO_2:Al_2O_3$, is in the range of from 15:1 to 22:1. Further, it is more preferred that, when the zeolitic material contained in the first aqueous mixture prepared according to (i) has a framework type BEA, the molar ratio of Si to Al, calculated as molar $SiO_2:Al_2O_3$, is in the range of 24:1 to 30:1.

It is preferred that the zeolitic material contained in the first aqueous mixture prepared according to (i), more preferably which has a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

It is preferred that the zeolitic material comprised in the first aqueous mixture prepared according to (i) has a BET specific surface area in the range of from 300 to 800 $m^2/g$, the BET specific surface area being determined as described in Reference Example 1.

It is more preferred that the zeolitic material, more preferably having a framework type CHA, comprised in the first aqueous mixture prepared according to (i) has a BET specific surface area in the range of from 400 to 700 $m^2/g$, more preferably in the range of from 500 to 630 $m^2/g$, the BET specific surface area being determined as described in Reference Example 1.

It is more preferred that the zeolitic material, more preferably having a framework type FER, comprised in the first aqueous mixture prepared according to (i) has a BET specific surface area in the range of from 300 to 500 $m^2/g$, the BET specific surface area being determined as described in Reference Example 1.

It is more preferred that the zeolitic material, more preferably having a framework type BEA, comprised in the first aqueous mixture prepared according to (i) has a BET specific surface area in the range of from 600 to 800 $m^2/g$, the BET specific surface area being determined as described in Reference Example 1.

As to the amount of copper, calculated as CuO, comprised in the zeolitic material contained in the first aqueous mixture prepared according to (i), it is preferred that it is in the range of from 1.5 to 15 weight-%, more preferably in the range of from 2 to 10 weight-%, based on the weight of the zeolitic material comprised in the first aqueous mixture prepared according to (i).

It is more preferred that the amount of copper, calculated as CuO, comprised in the zeolitic material contained in the first aqueous mixture prepared according to (i) is in the range of from 3 to 8 weight-%, more preferably in the range of from 4.5 to 7 weight-%, more preferably in the range of from 4.6 to 6 weight-%, more preferably in the range of from 4.8 to 5.5 weight-%, based on the weight of the zeolitic material comprised in the first aqueous mixture prepared according to (i). The present invention more preferably relates to a process for preparing a catalyst for the selective catalytic reduction of nitrogen oxide comprising a coating comprising iron and a zeolitic material comprising copper, the process comprising (i) preparing a first aqueous mixture comprising water and a zeolitic material comprising copper, wherein the amount of copper, calculated as CuO, comprised in the zeolitic material is in the range of from 1.5 to 15 weight-%, more preferably in the range of from 2 to 10 weight-%, more preferably in the range of from 3 to 8 weight-%, more preferably in the range of from 4.5 to 7 weight-%, more preferably in the range of from 4.6 to 6 weight-%, more preferably in the range of from 4.8 to 5.5 weight-%, based on the weight of the zeolitic material;

(ii) disposing the first aqueous mixture obtained according to (i) on the surface of the internal walls of a substrate comprising an inlet end, an outlet end, a substrate axial length extending from the inlet end to the outlet end and a plurality of passages defined by internal walls of the substrate extending therethrough, over x % of the substrate axial length from the inlet end to the outlet end of the substrate, wherein x is in the range of from 80 to 100; calcining the substrate having the first aqueous mixture disposed thereon, obtaining a substrate comprising a coating comprising a zeolitic material comprising copper;

(iii) preparing a second aqueous mixture comprising water and an iron salt;

(iv) disposing the second aqueous mixture obtained according to (iii) on the substrate obtained according to (ii) over y % of the substrate axial length from the inlet end to the outlet end of the substrate, wherein y is in the range of from 10 to x, obtaining a substrate comprising, in a first zone, the coating comprising a zeolitic material comprising copper and over y % of the substrate axial length an iron salt; and, if x>y, in a second zone extending from y % to x % of the substrate axial length from the inlet end to the outlet end, the coating comprising a zeolitic material comprising copper;

(v) calcining the substrate obtained according to (iv);

wherein the zeolitic material contained in the first aqueous mixture prepared according to (i) has a framework type CHA.

It is also more preferred that the amount of copper, calculated as CuO, comprised in the zeolitic material contained in the first aqueous mixture prepared according to (i) is in the range of from 2.5 to 6 weight-%, more preferably in the range of from 3 to 5 weight-%, more preferably in the range of from 3.2 to 4 weight-%, based on the weight of the zeolitic material comprised in the first aqueous mixture prepared according to (i). The present invention more preferably relates to a process for preparing a catalyst for the selective catalytic reduction of nitrogen oxide comprising a coating comprising iron and a zeolitic material comprising copper, the process comprising (i) preparing a first aqueous mixture comprising water and a zeolitic material comprising copper, wherein the amount of copper, calculated as CuO, comprised in the zeolitic material is in the range of from 2.5 to 6 weight-%, more preferably in the range of from 3 to 5 weight-%, more preferably in the range of from 3.2 to 4 weight-%, based on the weight of the zeolitic material;

(ii) disposing the first aqueous mixture obtained according to (i) on the surface of the internal walls of a substrate comprising an inlet end, an outlet end, a substrate axial length extending from the inlet end to the outlet end and a plurality of passages defined by internal walls of the substrate extending therethrough, over x % of the substrate axial length from the inlet end to the outlet end of the substrate, wherein x is in the range of from 80 to 100; calcining the substrate having the first aqueous mixture disposed thereon, obtaining a substrate comprising a coating comprising a zeolitic material comprising copper;

(iii) preparing a second aqueous mixture comprising water and an iron salt;

(iv) disposing the second aqueous mixture obtained according to (iii) on the substrate obtained according to (ii) over y % of the substrate axial length from the inlet end to the outlet end of the substrate, wherein y is in the range of from 10 to x, obtaining a substrate comprising, in a first zone, the coating comprising a zeolitic material comprising copper and over y % of the substrate axial length an iron salt; and, if x>y, in a second zone extending from y % to x % of the substrate axial length from the inlet end to the outlet end, the coating comprising a zeolitic material comprising copper;

(v) calcining the substrate obtained according to (iv);

wherein the zeolitic material contained in the first aqueous mixture prepared according to (i) has a framework type FER or BEA.

In the context of the present invention, it is preferred that the first aqueous mixture prepared according to (i) further comprises a precursor of an oxidic component, wherein the precursor more preferably is one or more of an aluminum salt, a silicon salt, a zirconium salt, and a titanium salt, more preferably one or more of a zirconium salt, and an aluminum salt, more preferably a zirconium salt, more preferably zirconium acetate.

It is preferred that, in the first aqueous mixture prepared according to (i), the amount of the precursor of the oxidic component, calculated as the oxide, more preferably as alumina, silica, zirconia or titania, more preferably the amount of the zirconium salt, calculated as $ZrO_2$, is in the range of from 1 to 10 weight-%, more preferably in the range of from 2 to 8 weight-%, more preferably in the range of from 3 to 7 weight-%, based on the weight of the zeolitic material comprised in the first aqueous mixture prepared according to (i).

It is preferred that the water comprised in the first aqueous mixture prepared according to (i) is deionized water.

It is preferred that the first aqueous mixture prepared according to (i) comprises at most 1000 ppm, preferably from 0 to 100 ppm, more preferably from 0 to 10 ppm of iron, calculated as elemental iron. In other words, it is preferred that the first aqueous mixture prepared according to (i) is substantially free of iron, more preferably free of iron. The present invention more preferably relates to a process for preparing a catalyst for the selective catalytic reduction of nitrogen oxide comprising a coating comprising iron and a zeolitic material comprising copper, the process comprising (i) preparing a first aqueous mixture comprising water and a zeolitic material comprising copper, wherein the amount of copper, calculated as CuO, comprised in the zeolitic material is in the range of from 1.5 to 15 weight-%, more preferably in the range of from 2 to 10 weight-%, more preferably in the range of from 3 to 8 weight-%, more preferably in the range of from 4.5 to 7 weight-%, more preferably in the range of from 4.6 to 6 weight-%, more preferably in the range of from 4.8 to 5.5 weight-%, based on the weight of the zeolitic material and wherein the first aqueous mixture comprises at most 1000 ppm, more preferably from 0 to 100 ppm, more preferably from 0 to 10 ppm of iron, calculated as elemental iron;

(ii) disposing the first aqueous mixture obtained according to (i) on the surface of the internal walls of a substrate comprising an inlet end, an outlet end, a substrate axial length extending from the inlet end to the outlet end and a plurality of passages defined by internal walls of the substrate extending therethrough, over x % of the substrate axial length from the inlet end to the outlet end of the substrate, wherein x is in the range of from 80 to 100; calcining the substrate having the first aqueous mixture disposed thereon, obtaining a substrate comprising a coating comprising a zeolitic material comprising copper;

(iii) preparing a second aqueous mixture comprising water and an iron salt;

(iv) disposing the second aqueous mixture obtained according to (iii) on the substrate obtained according to (ii) over y % of the substrate axial length from the inlet end to the outlet end of the substrate, wherein y is in the range of from 10 to x, obtaining a substrate comprising, in a first zone, the coating comprising over y % of the substrate axial length an iron salt and a zeolitic material comprising copper; and, if x>y, in a second zone extending from y % to x % of the substrate axial length from the inlet end to the outlet end, the coating comprising a zeolitic material comprising copper;

(v) calcining the substrate obtained according to (iv); wherein the zeolitic material contained in the first aqueous mixture prepared according to (i) has a framework type CHA. Alternatively, it is preferred that said zeolitic material contained in the first aqueous mixture prepared according to (i) has a framework type FER or BEA and more preferred that the amount of copper, calculated as CuO, comprised in the zeolitic material is in the range of from 2.5 to 6 weight-%, more preferably in the range of from 3 to 5 weight-%, more preferably in the range of from 3.2 to 4 weight-%, based on the weight of the zeolitic material.

In the context of the present invention, it is preferred that from 98 to 100 weight-%, more preferably from 99 to 100 weight-%, more preferably from 99.5 to 100 weight-%, more preferably from 99.9 to 100 weight-%, of the first aqueous mixture prepared according to (i) consist of water, the zeolitic material comprising copper, and more preferably a precursor of an oxide as defined in the foregoing.

It is preferred that, after preparing a first aqueous mixture according to (i) and prior to disposing said mixture on the substrate according to (ii), the first aqueous mixture is milled or mixed, more preferably until the particles of the first aqueous mixture have a Dv90 in the range of from 3 to 20 micrometers, more preferably in the range of from 5 to 15 micrometers, more preferably in the range of from 6 to 8 micrometers or more preferably in the range of from 9 to 12 micrometers, the Dv90 being determined as described in Reference Example 2. It is more preferred that, when zeolitic material contained in the first aqueous mixture prepared according to (i) has a framework type CHA, after preparing a first aqueous mixture according to (i) and prior to disposing said mixture on the substrate according to (ii), the first aqueous mixture is milled or mixed, more preferably until the particles of the first aqueous mixture have a Dv90 in the range of from 9 to 12 micrometers. Further, it is more preferred that, when zeolitic material contained in the first aqueous mixture prepared according to (i) has a framework type FER or BEA, after preparing a first aqueous mixture according to (i) and prior to disposing said mixture on the substrate according to (ii), the first aqueous mixture is milled or mixed, more preferably until the particles of the first aqueous mixture have a Dv90 in the range of from 6 to 8 micrometers.

As to the substrate provided in (ii), it is preferred that it is a flow-through substrate or a wall-flow filter substrate, more preferably a flow-through substrate.

As to the substrate provided in (ii), it is preferred that it comprises, more preferably consists of, a ceramic substance, wherein the ceramic substance more preferably comprises, more preferably consists of, one or more of an alumina, a silica, a silicate, an aluminosilicate, a cordierite, a mullite, an aluminotitanate, a silicon carbide, a zirconia, a magnesia, more preferably a spinel, and a titania, more preferably one or more of a silicon carbide and a cordierite, more preferably a cordierite.

It is preferred that x is in the range of from 90 to 100, more preferably in the range of from 95 to 100, more preferably in the range of from 98 to 100, more preferably in the range of from 99 to 100.

It is preferred that, prior to calcining according to (ii), the substrate having the first aqueous mixture disposed thereon is dried in a gas atmosphere having a temperature in the range of from 90 to 250° C., more preferably in the range of from 100 to 150° C., the gas atmosphere more preferably being air.

It is preferred that drying is performed for a duration in the range of from 10 to 360 minutes, more preferably in the range of from 20 to 240 minutes, more preferably in the range of from 30 to 90 minutes.

As to calcining the substrate having the first aqueous mixture disposed thereon according to (ii), it is preferred that it is performed in a gas atmosphere having a temperature in the range of from 400 to 800° C., more preferably in the range of from 500 to 700° C., more preferably in the range of from 550 to 650° C., the gas atmosphere more preferably being air.

As to calcining the substrate having the first aqueous mixture disposed thereon according to (ii), it is preferred that it is performed in a gas atmosphere for a duration in the range of from 5 to 360 minutes, more preferably in the range of from 20 to 240 minutes, more preferably in the range of from 30 to 90 minutes, the gas atmosphere more preferably comprising, more preferably consisting of, air.

It is preferred that the substrate comprising the coating comprising a zeolitic material comprising copper obtained according to (ii) has a water adsorption, expressed in weight of $H_2O$ relative to the volume of the coating, in the range of from 1 to 5 g/in$^3$, more preferably in the range of from 1.5 to 4 g/in$^3$, more preferably in the range of from 2 to 3.5 g/in$^3$, the water adsorption being determined as defined in Reference Example 5. The present invention more preferably relates to a process for preparing a catalyst for the selective catalytic reduction of nitrogen oxide comprising a coating comprising iron and a zeolitic material comprising copper, the process comprising (i) preparing a first aqueous mixture comprising water and a zeolitic material comprising copper;

(ii) disposing the first aqueous mixture obtained according to (i) on the surface of the internal walls of a substrate comprising an inlet end, an outlet end, a substrate axial length extending from the inlet end to the outlet end and a plurality of passages defined by internal walls of the substrate extending therethrough, over x % of the substrate axial length from the inlet end to the outlet end of the substrate, wherein x is in the range of from 80 to 100; calcining the substrate having the first aqueous mixture disposed thereon, obtaining a substrate comprising a coating comprising a zeolitic material comprising copper, wherein the substrate comprising the coating comprising a zeolitic material comprising copper obtained according to (ii) has a water adsorption, expressed in weight of $H_2O$ relative to the volume of the coating, in the range of from 1 to

9

5 g/in³, more preferably in the range of from 1.5 to 4 g/in³, more preferably in the range of from 2 to 3.5 g/in³, the water adsorption being determined as defined in Reference Example 5;

(iii) preparing a second aqueous mixture comprising water and an iron salt;

(iv) disposing the second aqueous mixture obtained according to (iii) on the substrate obtained according to (ii) over y % of the substrate axial length from the inlet end to the outlet end of the substrate, wherein y is in the range of from 10 to x, obtaining a substrate comprising, in a first zone, the coating comprising over y % of the substrate axial length an iron salt and a zeolitic material comprising copper; and, if x>y, in a second zone extending from y % to x % of the substrate axial length from the inlet end to the outlet end, the coating comprising a zeolitic material comprising copper;

(v) calcining the substrate obtained according to (iv); wherein the zeolitic material contained in the first aqueous mixture prepared according to (i) has a framework type CHA or FER or BEA.

In the context of the present invention, it is preferred that the iron salt comprised in the second aqueous mixture prepared according to (iii) is one or more of iron (III) nitrate, iron (II) acetate, ammonium iron (III) citrate, iron (II) sulfate, and iron (II) oxalate, more preferably iron (III) nitrate, more preferably iron (III) nitrate nonahydrate.

As to the second aqueous mixture prepared according to (iii), it is preferred that it comprises the iron salt in an amount, calculated as Fe₂O₃, which is in the range of from 4 to 40 weight-%, more preferably in the range of from 7 to 30 weight-%, more preferably in the range of from 10 to 25 weight-%, more preferably in the range of from 13 to 22 weight-%, more preferably in the range of from 15 to 20 weight-%, based on the weight of the second aqueous mixture prepared according to (iii).

It is preferred that the water comprised in the second aqueous mixture prepared according to (iii) is deionized water.

It is preferred that from 98 to 100 weight-%, more preferably from 99 to 100 weight-%, more preferably from 99.5 to 100 weight-%, more preferably from 99.9 to 100 weight-%, of the second aqueous mixture prepared according to (iii) consist of water and the iron salt, more preferably iron (III) nitrate.

It is preferred that, according to (iv) disposing the second aqueous mixture obtained according to (iii) on the substrate obtained according to (ii) comprises dipping the substrate comprising the coating comprising a zeolitic material comprising copper obtained according to (ii) into the second aqueous mixture prepared according to (iii), more preferably for a duration in the range of from 5 to 120 seconds, more preferably in the range of from 7 to 80 seconds, more preferably in the range of from 9 to 60 seconds, more preferably in the range of from 10 to 50 seconds.

It is preferred that y is in the range of from 20 to x. It is more preferred that y is in the range of from 20 to 60, more preferably in the range of from 40 to 60. Alternatively, it is more preferred that y is in the range of from 80 to x, more preferably in the range of from 90 to x, more preferably x=y.

It is preferred that, prior to calcining according to (v), the substrate obtained in (iv) is dried in a gas atmosphere having a temperature in the range of from 80 to 250° C., more preferably in the range of from 90 to 200° C., more preferably in the range of from 100 to 150° C., more preferably in the range of from 110 to 130° C.

It is preferred that, prior to calcining according to (v), the substrate obtained in (iv) is dried in a gas atmosphere for a duration in the range of from 10 to 180 minutes, more preferably in the range of from 20 to 120 minutes, more preferably in the range of from 30 to 90 minutes, more preferably in the range of from 40 to 80 minutes.

It is preferred that the gas atmosphere comprises, more preferably consists of, air.

It is preferred that calcining according to (v) is performed in a gas atmosphere having a temperature in the range of from 400 to 800° C., more preferably in the range of from 450 to 700° C., more preferably in the range of from 500 to 650° C., more preferably in the range of from 550 to 650° C.

As to calcining according to (v), it is preferred that it is performed in a gas atmosphere for a duration in the range of from 10 to 180 minutes, more preferably in the range of from 20 to 120 minutes, more preferably in the range of from 30 to 90 minutes, more preferably in the range of from 40 to 80 minutes.

It is preferred that the gas atmosphere comprises, more preferably consists of, air.

It is preferred that the process according to the present invention consists of (i), (ii), (iii), (iv) and (v).

The present invention further relates to a catalyst for the selective catalytic reduction of nitrogen oxide, preferably obtainable or obtained by a process according to the present invention, comprising (a) a substrate comprising an inlet end, an outlet end, a substrate axial length extending from the inlet end to the outlet end and a plurality of passages defined by internal walls of the substrate extending therethrough;

(b) a coating disposed on the surface of the internal walls of the substrate (a) over x % of the substrate axial length, from the inlet end to the outlet end of the substrate (a), wherein x is in the range of from 80 to 100, the coating comprising a zeolitic material comprising copper;

wherein the catalyst exhibits one or more zones:

(b.1) a first zone extending over y % of the substrate axial length, from the inlet end to the outlet end of the substrate (a), wherein y is in the range of from 10 to x; wherein the first zone comprises the coating comprising the zeolitic material comprising copper, wherein, in said zone, the coating further comprises iron;

(b.2) if x>y, a second zone extending from y % to x % of the substrate axial length from the inlet end to the outlet end of the substrate (a), wherein the second zone comprises the coating comprising a zeolitic material comprising copper.

As to the zeolitic material comprising copper contained in the coating, it is preferred that it has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ,

*MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof.

It is more preferred that the zeolitic material comprising copper contained in the coating has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI. It is more preferred that the zeolitic material comprising copper contained in the coating has a framework type CHA. Thus, the present invention more preferably relates to a catalyst for the selective catalytic reduction of nitrogen oxide, more preferably obtainable or obtained by a process according to the present invention, comprising (a) a substrate comprising an inlet end, an outlet end, a substrate axial length extending from the inlet end to the outlet end and a plurality of passages defined by internal walls of the substrate extending therethrough;

(b) a coating disposed on the surface of the internal walls of the substrate (a) over x % of the substrate axial length, from the inlet end to the outlet end of the substrate (a), wherein x is in the range of from 80 to 100, the coating comprising a zeolitic material comprising copper;

wherein the catalyst exhibits one or more zones:

(b.1) a first zone extending over y % of the substrate axial length, from the inlet end to the outlet end of the substrate (a), wherein y is in the range of from 10 to x; wherein the first zone comprises the coating comprising the zeolitic material comprising copper, wherein, in said zone, the coating further comprises iron;

(b.2) if x>y, a second zone extending from y % to x % of the substrate axial length from the inlet end to the outlet end of the substrate (a), wherein the second zone comprises the coating comprising a zeolitic material comprising copper;

wherein the zeolitic material comprising copper contained in the coating has a framework type CHA.

Alternatively, it is more preferred that the zeolitic material comprising copper contained in the coating has a framework type selected from the group consisting of FER, BEA, MFI, FAU, MOR, a mixture of two or more thereof and a mixed type of two or more thereof, more preferably selected from the group consisting of FER, BEA, MFI, FAU, a mixture of two or more thereof and a mixed type of two or more thereof. It is more preferred that the zeolitic material comprising copper contained in the coating has a framework type FER or BEA. Thus, the present invention more preferably relates to a catalyst for the selective catalytic reduction of nitrogen oxide, more preferably obtainable or obtained by a process according to the present invention, comprising (a) a substrate comprising an inlet end, an outlet end, a substrate axial length extending from the inlet end to the outlet end and a plurality of passages defined by internal walls of the substrate extending therethrough;

(b) a coating disposed on the surface of the internal walls of the substrate (a) over x % of the substrate axial length, from the inlet end to the outlet end of the substrate (a), wherein x is in the range of from 80 to 100, the coating comprising a zeolitic material comprising copper;

wherein the catalyst exhibits one or more zones:

(b.1) a first zone extending over y % of the substrate axial length, from the inlet end to the outlet end of the substrate (a), wherein y is in the range of from 10 to x; wherein the first zone comprises the coating comprising the zeolitic material comprising copper, wherein, in said zone, the coating further comprises iron;

(b.2) if x>y, a second zone extending from y % to x % of the substrate axial length from the inlet end to the outlet end of the substrate (a), wherein the second zone comprises the coating comprising a zeolitic material comprising copper;

wherein the zeolitic material comprising copper contained in the coating has a framework type FER or BEA.

In the context of the present invention, it is preferred that from 95 to 100 weight-%, more preferably from 98 to 100 weight-%, more preferably from 99 to 100 weight-%, of the framework structure of the zeolitic material consist of Si, Al, 0, and optionally H. It is preferred that, in the framework structure, the molar ratio of Si to Al, calculated as molar $SiO_2:Al_2O_3$, is in the range of from 2:1 to 50:1, more preferably in the range of from 5:1 to 45:1, more preferably in the range of from 7:1 to 35:1, more preferably in the range of from 10:1 to 30:1, more preferably in the range of from 15:1 to 22:1 or more preferably in the range of from 24:1 to 30:1.

It is more preferred that, when the zeolitic material contained in the coating has a framework type CHA or FER, the molar ratio of Si to Al, calculated as molar $SiO_2:Al_2O_3$, is in the range of from 15:1 to 22:1. Further, it is more preferred that, when the zeolitic material contained in the coating has a framework type BEA, the molar ratio of Si to Al, calculated as molar $SiO_2:Al_2O_3$, is in the range of 24:1 to 30:1.

It is preferred that the zeolitic material contained in the coating, more preferably which has a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

As to the amount of copper, calculated as CuO, comprised in the zeolitic material contained in the coating, it is preferred that it is in the range of from 1.5 to 15 weight-%, more preferably in the range of from 2 to 10 weight-%, based on the weight of the zeolitic material comprised in the coating.

It is more preferred that the amount of copper, calculated as CuO, comprised in the zeolitic material contained in the coating is in the range of from 3 to 8 weight-%, more preferably in the range of from 4.5 to 7 weight-%, more preferably in the range of from 4.6 to 6 weight-%, more preferably in the range of from 4.8 to 5.5 weight-%, based on the weight of the zeolitic material comprised in the coating. Thus, the present invention more preferably relates to a catalyst for the selective catalytic reduction of nitrogen oxide, more preferably obtainable or obtained by a process according to the present invention, comprising (a) a substrate comprising an inlet end, an outlet end, a substrate axial length extending from the inlet end to the outlet end and a plurality of passages defined by internal walls of the substrate extending therethrough;

(b) a coating disposed on the surface of the internal walls of the substrate (a) over x % of the substrate axial length, from the inlet end to the outlet end of the substrate (a), wherein x is in the range of from 80 to 100, the coating comprising a zeolitic material comprising copper;

wherein the catalyst exhibits one or more zones:

(b.1) a first zone extending over y % of the substrate axial length, from the inlet end to the outlet end of the substrate (a), wherein y is in the range of from 10 to x; wherein the first zone comprises the coating comprising the zeolitic material comprising copper, wherein, in said zone, the coating further comprises iron;

(b.2) if x>y, a second zone extending from y % to x % of the substrate axial length from the inlet end to the outlet end of the substrate (a), wherein the second zone comprises the coating comprising a zeolitic material comprising copper;

wherein the zeolitic material comprising copper contained in the coating has a framework type CHA;

wherein the amount of copper, calculated as CuO, comprised in the zeolitic material contained in the coating is in the range of from 4.5 to 7 weight-%, more preferably in the range of from 4.6 to 6 weight-%, more preferably in the range of from 4.8 to 5.5 weight-%, based on the weight of the zeolitic material comprised in the coating.

It is also more preferred that the amount of copper, calculated as CuO, comprised in the zeolitic material contained in the coating is in the range of from 2.5 to 6 weight-%, more preferably in the range of from 3 to 5 weight-%, more preferably in the range of from 3.2 to 4 weight-%, based on the weight of the zeolitic material comprised in the coating. Thus, the present invention more preferably relates to a catalyst for the selective catalytic reduction of nitrogen oxide, more preferably obtainable or obtained by a process according to the present invention, comprising (a) a substrate comprising an inlet end, an outlet end, a substrate axial length extending from the inlet end to the outlet end and a plurality of passages defined by internal walls of the substrate extending therethrough;

(b) a coating disposed on the surface of the internal walls of the substrate (a) over x % of the substrate axial length, from the inlet end to the outlet end of the substrate (a), wherein x is in the range of from 80 to 100, the coating comprising a zeolitic material comprising copper;

wherein the catalyst exhibits one or more zones:

(b.1) a first zone extending over y % of the substrate axial length, from the inlet end to the outlet end of the substrate (a), wherein y is in the range of from 10 to x; wherein the first zone comprises the coating comprising the zeolitic material comprising copper, wherein, in said zone, the coating further comprises iron;

(b.2) if x>y, a second zone extending from y % to x % of the substrate axial length from the inlet end to the outlet end of the substrate (a), wherein the second zone comprises the coating comprising a zeolitic material comprising copper;

wherein the zeolitic material comprising copper contained in the coating has a framework type FER or BEA;

wherein the amount of copper, calculated as CuO, comprised in the zeolitic material contained in the coating is in the range of from 2.5 to 6 weight-%, more preferably in the range of from 3 to 5 weight-%, more preferably in the range of from 3.2 to 4 weight-%, based on the weight of the zeolitic material comprised in the coating.

In the context of the present invention, it is preferred that the coating further comprises an oxidic component, wherein the oxidic component more preferably is one or more of alumina, silica, zirconia, and titania, more preferably one or more of zirconia and alumina, more preferably zirconia.

As to the amount of the oxidic component, calculated as the oxide, preferably the amount of zirconia, calculated as $ZrO_2$, it is preferred that it is in the range of from 1 to 10 weight-%, more preferably in the range of from 2 to 8 weight-%, more preferably in the range of from 3 to 7 weight-%, based on the weight of the zeolitic material comprised in the coating.

It is preferred that x is in the range of from 90 to 100, more preferably in the range of from 95 to 100, more preferably in the range of from 98 to 100, more preferably in the range of from 99 to 100.

As to the loading of the coating, it is preferred that it is in the range of from 1 to 6 g/in$^3$, more preferably in the range of from 1.5 to 4 g/in$^3$, more preferably in the range of from 1.75 to 3 g/in$^3$. It is preferred that y is in the range of from 20 to x. It is more preferred that y is in the range of from 20 to 60, more preferably in the range of from 40 to 60. Alternatively, it is preferred that y is in the range of from 80 to x, more preferably in the range of from 90 to x, more preferably x=y.

As to the amount of iron, it is preferred that the coating comprised in the first zone comprises iron in an amount in the range of from 0.5 to 3.5 weight-%, more preferably in the range of from 1 to 3 weight-%, more preferably in the range of from 1.5 to 2.5 weight-%, or more preferably in the range of from 3.1 to 3.3 weight-%, based on the weight of the zeolitic material, which preferably has a framework type CHA.

As to the amount of iron, it is preferred that the coating comprised in the first zone comprises iron in an amount in the range of from 0.5 to 3.5 weight-%, more preferably in the range of from 0.75 to 3 weight-%, more preferably in the range of from 1 to 2 weight-%, based on the weight of the zeolitic material, which preferably has a framework type FER.

As to the amount of iron, it is preferred that the coating comprised in the first zone comprises iron in an amount in the range of from 0.5 to 3.5 weight-%, more preferably in the range of from 1 to 3 weight-%, more preferably in the range of from 1.2 to 2 weight-%, based on the weight of the zeolitic material, which preferably has a framework type BEA.

It is preferred that from 98 to 100 weight-%, more preferably from 99 to 100 weight-%, more preferably from 99.5 to 100 weight-%, more preferably from 99.9 to 100 weight-%, of the coating comprised in the first zone consist of iron, a zeolitic material comprising copper and more preferably an oxidic component as defined in the foregoing.

It is preferred that the catalyst exhibits two zones.

It is preferred that x>y.

It is preferred that from 0 to 0.001 weight-%, more preferably from 0 to 0.0001 weight-%, more preferably from 0 to 0.00001 weight-%, of the coating comprised in the second zone consist of iron, calculated as $Fe_2O_3$. In other words, it is preferred that the coating in the second zone is substantially free, more preferably free of, iron.

It is preferred that from 98 to 100 weight-%, more preferably from 99 to 100 weight-%, more preferably from 99.5 to 100 weight-%, more preferably from 99.9 to 100 weight-%, of the coating comprised in the second zone consist of a zeolitic material comprising copper and more preferably an oxidic component as defined in the foregoing.

It is preferred that from 0 to 0.001 weight-%, more preferably from 0 to 0.0001 weight-%, more preferably from 0 to 0.00001 weight-%, of the coating consist of vanadium. In other words, it is preferred that the coating is substantially free, more preferably free of, vanadium.

It is preferred that from 0 to 0.001 weight-%, more preferably from 0 to 0.0001 weight-%, more preferably from 0 to 0.00001 weight-%, of the coating consist of any platinum group metals. In other words, it is preferred that the coating is substantially free, more preferably free of, any platinum group metals.

As to the substrate (a), it is preferred that it is a flow-through substrate or a wall-flow filter substrate, more preferably a flow-through substrate.

It is preferred that the substrate (a) comprises, more preferably consists of, a ceramic substance, wherein the ceramic substance more preferably comprises, more preferably consists of, one or more of an alumina, a silica, a silicate, an aluminosilicate, a cordierite, a mullite, an aluminotitanate, a silicon carbide, a zirconia, a magnesia, more preferably a spinel, and a titania, more preferably one or more of a silicon carbide and a cordierite. It is more preferred that the ceramic substance comprises, more preferably consists of, a cordierite. It is more preferred that the substrate (a) is a cordierite flow-through substrate.

It is preferred that the catalyst of the present invention consists of the substrate (a) and the coating (b).

The present invention further relates to a use of a catalyst according to the present invention for the selective catalytic reduction of nitrogen oxide, preferably exiting from a diesel engine.

The present invention further relates to a method for the selective catalytic reduction of nitrogen oxides, said method comprising (1) providing the exhaust gas stream, preferably from a diesel engine;

(2) passing the exhaust gas stream provided in (1) through a catalyst for the selective catalytic reduction according to the present invention.

The present invention further relates to an exhaust gas treatment system for the treatment of exhaust gas exiting from an internal combustion engine, preferably from a diesel engine, the system comprising a catalyst for the selective catalytic reduction of nitrogen oxide according to the present invention and one or more of a diesel oxidation catalyst, an ammonia oxidation catalyst, a selective catalytic reduction catalyst, a catalyzed soot filter and a SCR/ammonia oxidation (AMOx) catalyst.

According to a preferred first aspect, the system of the present invention comprises a diesel oxidation catalyst, a catalyzed soot filter and a catalyst for the selective catalytic reduction of nitrogen oxide according to the present invention, wherein the diesel oxidation catalyst is positioned upstream of the catalyzed soot filter and wherein the catalyzed soot filter is positioned upstream of the catalyst for the selective catalytic reduction of nitrogen oxide according to the present invention. It is more preferred according to said aspect that the diesel oxidation catalyst is the first catalyst of the system and no catalyst is present between the engine and the diesel oxidation catalyst.

According to the first aspect, it is preferred that the system further comprises a selective catalytic reduction catalyst which is positioned downstream of the catalyst for the selective catalytic reduction of nitrogen oxide according to the present invention; wherein the system more preferably further comprises an ammonia oxidation catalyst, said ammonia oxidation catalyst being positioned downstream of the selective catalytic reduction catalyst.

According to said first aspect, it is preferred that the system further comprises a reductant injector, the reductant injector being positioned downstream of the catalyzed soot filter and upstream of the catalyst for the selective catalytic reduction of nitrogen oxide according to the present invention, wherein the reductant more preferably is urea.

According a preferred second aspect, the system of the present invention comprises a diesel oxidation catalyst, a catalyzed soot filter and a catalyst for the selective catalytic reduction of nitrogen oxide according to the present invention, wherein the diesel oxidation catalyst is positioned upstream of the catalyst for the selective catalytic reduction of nitrogen oxide according to the present invention and wherein the catalyst for the selective catalytic reduction of nitrogen oxide according to the present invention is positioned upstream of the catalyzed soot filter; wherein the diesel oxidation catalyst more preferably is the first catalyst of the system and more preferably no catalyst is present between the engine and the diesel oxidation catalyst.

According to the second aspect, it is preferred that the system further comprises a selective catalytic reduction catalyst which is positioned downstream of the catalyst for the selective catalytic reduction of nitrogen oxide according to the present invention and upstream of the catalyzed soot filter. According to said aspect, it is more preferred that the system further comprises an ammonia oxidation catalyst, said ammonia oxidation catalyst being positioned downstream of the selective catalytic reduction catalyst and upstream of the catalyzed soot filter.

According to the second aspect, it is preferred that the system further comprises a SCR/AMOx catalyst positioned downstream of the catalyzed soot filter, wherein the system more preferably further comprises a reductant injector positioned upstream of the SCR/AMOx catalyst and downstream of the catalyzed soot filter, the reductant more preferably being urea. In the context of the present invention, it is noted that the SCR/AMOx catalyst preferably comprises a substrate comprising an AMOx coating disposed on the substrate and a SCR coating disposed on the AMOx coating, wherein the AMOx coating more preferably comprises a platinum group metal, more preferably platinum, supported on a non-zeolitic oxidic material. Said non-zeolitic oxidic material more preferably comprises, more preferably consists of, one or more of alumina, silica, titania and zirconia, more preferably one or more of alumina, silica and titania, more preferably one or more of alumina and silica, more preferably alumina. Further, it is more preferred that the SCR catalyst comprises a zeolitic material comprising copper, more preferably a zeolitic material comprising copper as defined in the foregoing relative to the inventive SCR catalyst.

According to the second aspect, it is preferred that the system further comprises a reductant injector, the reductant injector being positioned downstream of the diesel oxidation catalyst and upstream of the catalyst for the selective catalytic reduction of nitrogen oxide according to the present invention, wherein the reductant more preferably is urea.

According to a preferred third aspect, the system of the present invention comprises a catalyst for the selective catalytic reduction of nitrogen oxide according to the present invention and a catalyzed soot filter, wherein the catalyst for the selective catalytic reduction of nitrogen oxide according to the present invention is positioned upstream of the catalyzed soot filter; wherein the catalyst for the selective catalytic reduction of nitrogen oxide according to the present invention more preferably is the first catalyst of the system and more preferably no catalyst is present between the engine and the catalyst for the selective catalytic reduction of nitrogen oxide according to the present invention.

According to the third aspect, it is preferred that the system further comprises a selective catalytic reduction catalyst which is positioned downstream of the catalyst for the selective catalytic reduction of nitrogen oxide according to the present invention and upstream of the catalyzed soot filter. According to said aspect, it is more preferred that the system further comprises an ammonia oxidation catalyst, said ammonia oxidation catalyst being positioned downstream of the selective catalytic reduction catalyst and upstream of the catalyzed soot filter.

According to the third aspect, it is preferred that the system further comprises a SCR/AMOx catalyst positioned downstream of the catalyzed soot filter, wherein the system more preferably further comprises a reductant injector positioned upstream of the SCR/AMOx catalyst and downstream of the catalyzed soot filter, the reductant more preferably being urea. In the context of the present invention, it is noted that the SCR/AMOx catalyst is preferably as defined in the foregoing.

According to the third aspect, it is preferred that the system further comprises a first reductant injector, the first reductant injector being positioned upstream of the catalyst for the selective catalytic reduction of nitrogen oxide according to the present invention, wherein the reductant more preferably is urea.

According to a fourth aspect, it is preferred that the system comprises a catalyst for the selective catalytic reduction of nitrogen oxide according to the present invention and a SCR/AMOx catalyst positioned downstream of the catalyst for the selective catalytic reduction of nitrogen oxide according to the present invention. It is more preferred that no additional catalyst is present between the catalyst for the selective catalytic reduction of nitrogen oxide according to the present invention and the SCR/AMOx catalyst. In the context of the present invention, it is noted that the SCR/AMOx catalyst is preferably as defined in the foregoing.

II. An Exhaust Gas Treatment Catalyst

It was also surprisingly found that the exhaust gas treatment catalyst according to the present invention which exhibits great NOx conversion and ammonia oxidation, while presenting reduced $N_2O$ emissions.

Therefore, the present invention relates to an exhaust gas treatment catalyst comprising (a) a substrate comprising an inlet end, an outlet end, a substrate axial length extending from the inlet end to the outlet end and a plurality of passages defined by internal walls of the substrate extending therethrough;

(b) a first coating disposed on the surface of the internal walls of the substrate (a) over z % of the substrate axial length, from the outlet end to the inlet end of the substrate (a), wherein z is in the range of from 5 to 100, the first coating comprising an ammonia oxidation catalyst;

(c) a second coating disposed on the first coating, or on the first coating and the surface of the internal walls of the substrate, over x % of the substrate axial length, from the inlet end to the outlet end of the substrate (a), wherein x is in the range of from 80 to 100, the second coating comprising a zeolitic material comprising copper;

wherein the catalyst exhibits one or more zones:

(b.1) a first zone extending over y % of the substrate axial length, from the inlet end to the outlet end of the substrate (a), wherein y is in the range of from 10 to x; wherein the first zone comprises the second coating comprising the zeolitic material comprising copper, wherein, in said zone, the second coating further comprises iron;

(b.2) if x>y, a second zone extending from y % to x % of the substrate axial length from the inlet end to the outlet end of the substrate (a), wherein the second zone comprises the second coating comprising a zeolitic material comprising copper.

As to the first coating (b), it is preferred that z is in the range of from 7 to 70, more preferably in the range of from 8 to 50, more preferably in the range of from 9 to 40, more preferably in the range of from 10 to 35. It is more preferred that the first zone is free of the first coating.

As to the first coating (b), it is preferred that the ammonia oxidation catalyst comprises a platinum group metal component, wherein the platinum group metal component more preferably is one or more of platinum, palladium, rhodium, osmium and iridium, more preferably one or more of platinum, palladium and rhodium, more preferably one or more of platinum and palladium, more preferably platinum.

It is preferred that the first coating (b) comprises the platinum group metal component, more preferably platinum, calculated as elemental platinum group metal, more preferably calculated as elemental platinum, at a loading in the range of from 1 to 200 g/ft³, more preferably in the range of from 2 to 100 g/ft³.

It is preferred that the ammonia oxidation catalyst further comprises a non-zeolitic oxidic material supporting the platinum group metal component, wherein the non-zeolitic oxidic material more preferably comprises one or more of alumina, silica, titania, and zirconia, more preferably one or more of alumina, silica and titania, more preferably one or more of alumina and silica, wherein the non-zeolitic oxidic material more preferably comprises alumina. It is more preferred that the non-zeolitic oxidic material consists of alumina.

Therefore, the present invention preferably relates to an exhaust gas treatment catalyst comprising (a) a substrate comprising an inlet end, an outlet end, a substrate axial length extending from the inlet end to the outlet end and a plurality of passages defined by internal walls of the substrate extending therethrough;

(b) a first coating disposed on the surface of the internal walls of the substrate (a) over z % of the substrate axial length, from the outlet end to the inlet end of the substrate (a), wherein z is in the range of from 5 to 100, the first coating comprising a platinum group metal component and a non-zeolitic oxidic material supporting the platinum group metal component;

(c) a second coating disposed on the first coating, or on the first coating and the surface of the internal walls of the substrate, over x % of the substrate axial length, from the inlet end to the outlet end of the substrate (a), wherein x is in the range of from 80 to 100, the second coating comprising a zeolitic material comprising copper;

wherein the catalyst exhibits one or more zones:

(b.1) a first zone extending over y % of the substrate axial length, from the inlet end to the outlet end of the substrate (a), wherein y is in the range of from 10 to x; wherein the first zone comprises the second coating comprising the zeolitic material comprising copper, wherein, in said zone, the second coating further comprises iron;

(b.2) if x>y, a second zone extending from y % to x % of the substrate axial length from the inlet end to the outlet end of the substrate (a), wherein the second zone comprises the second coating comprising a zeolitic material comprising copper.

In the context of the present invention, it is preferred that from 98 to 100 weight-%, more preferably from 99 to 100 weight-%, more preferably from 99.5 to 100 weight-%, more preferably from 99.9 to 100 weight-%, of the ammonia oxidation catalyst consist of the platinum group metal component and the non-zeolitic oxidic material.

It is preferred that the catalyst comprises the first coating (b) at a loading in the range of from 0.25 to 10 g/in$^3$, more preferably in the range of from 0.5 to 8 g/in$^3$, more preferably in the range of from 1 to 5 g/in$^3$.

Preferably from 98 to 100 weight-%, more preferably from 99 to 100 weight-%, more preferably from 99.5 to 100 weight-%, more preferably from 99.9 to 100 weight-%, of the first coating consist of the ammonia oxidation catalyst.

As to the second coating (c), it is preferred that the zeolitic material comprising copper contained in said second coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEl, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEl, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof.

It is more preferred that the zeolitic material comprising copper contained in said second coating has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI. It is more preferred that the zeolitic material comprising copper contained in the second coating has a framework type CHA.

Therefore, the present invention preferably relates to an exhaust gas treatment catalyst comprising (a) a substrate comprising an inlet end, an outlet end, a substrate axial length extending from the inlet end to the outlet end and a plurality of passages defined by internal walls of the substrate extending therethrough;

(b) a first coating disposed on the surface of the internal walls of the substrate (a) over z % of the substrate axial length, from the outlet end to the inlet end of the substrate (a), wherein z is in the range of from 5 to 100, the first coating comprising a platinum group metal component and a non-zeolitic oxidic material supporting the platinum group metal component;

(c) a second coating disposed on the first coating, or on the first coating and the surface of the internal walls of the substrate, over x % of the substrate axial length, from the inlet end to the outlet end of the substrate (a), wherein x is in the range of from 80 to 100, the second coating comprising a zeolitic material comprising copper, wherein the zeolitic material has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, more preferably CHA;

wherein the catalyst exhibits one or more zones:

(b.1) a first zone extending over y % of the substrate axial length, from the inlet end to the outlet end of the substrate (a), wherein y is in the range of from 10 to x; wherein the first zone comprises the second coating comprising the zeolitic material comprising copper, wherein, in said zone, the second coating further comprises iron;

(b.2) if x>y, a second zone extending from y % to x % of the substrate axial length from the inlet end to the outlet end of the substrate (a), wherein the second zone comprises the second coating comprising a zeolitic material comprising copper.

Alternatively, it is more preferred that the zeolitic material comprising copper contained in said second coating has a framework type selected from the group consisting of FER, BEA, MFI, FAU, MOR, a mixture of two or more thereof and a mixed type of two or more thereof, more preferably selected from the group consisting of FER, BEA, MFI, FAU, a mixture of two or more thereof and a mixed type of two or more thereof. It is more preferred that the zeolitic material comprising copper contained in the second coating has a framework type FER or BEA. Thus, the present invention more preferably relates to an exhaust gas treatment catalyst comprising (a) a substrate comprising an inlet end, an outlet end, a substrate axial length extending from the inlet end to the outlet end and a plurality of passages defined by internal walls of the substrate extending therethrough;

(b) a first coating disposed on the surface of the internal walls of the substrate (a) over z % of the substrate axial length, from the outlet end to the inlet end of the substrate (a), wherein z is in the range of from 5 to 100, the first coating comprising a platinum group metal component and a non-zeolitic oxidic material supporting the platinum group metal component;

(c) a second coating disposed on the first coating, or on the first coating and the surface of the internal walls of the substrate, over x % of the substrate axial length, from the inlet end to the outlet end of the substrate (a), wherein x is in the range of from 80 to 100, the second coating comprising a zeolitic material comprising copper, wherein the zeolitic material has a framework type selected from the group consisting of FER, BEA, MFI, FAU, a mixture of two or more thereof and a mixed type of two or more thereof, more preferably has a framework type FER or BEA;

wherein the catalyst exhibits one or more zones:

(b.1) a first zone extending over y % of the substrate axial length, from the inlet end to the outlet end of the substrate (a), wherein y is in the range of from 10 to x; wherein the first zone comprises the second coating comprising the zeolitic material comprising copper, wherein, in said zone, the second coating further comprises iron;

(b.2) if x>y, a second zone extending from y % to x % of the substrate axial length from the inlet end to the outlet end of the substrate (a), wherein the second zone comprises the second coating comprising a zeolitic material comprising copper.

In the context of the present invention, it is preferred that from 95 to 100 weight-%, more preferably from 98 to 100 weight-%, more preferably from 99 to 100 weight-%, of the framework structure of the zeolitic material comprised in the second coating (c) consist of Si, Al, and O, wherein in the framework structure, the molar ratio of Si to Al, calculated as molar $SiO_2:Al_2O_3$, more preferably is in the range of from 2:1 to 50:1, more preferably in the range of from 5:1 to 45:1, more preferably in the range of from 7:1 to 35:1, more preferably in the range of from 10:1 to 30:1, more preferably in the range of from 15:1 to 22:1 or more preferably in the range of from 24:1 to 30:1.

It is more preferred that, when the zeolitic material contained in the second coating has a framework type CHA or FER, the molar ratio of Si to Al, calculated as molar $SiO_2:Al_2O_3$, is in the range of from 15:1 to 22:1. Further, it is more preferred that, when the zeolitic material contained in the second coating has a framework type BEA, the molar ratio of Si to Al, calculated as molar $SiO_2:Al_2O_3$, is in the range of from 24:1 to 30:1.

It is preferred that the zeolitic material contained in the second coating, more preferably which has a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

As to the second coating (c), it is preferred that the amount of copper, calculated as CuO, comprised in the zeolitic material contained in said second coating is in the range of from 1.5 to 15 weight-%, more preferably in the range of from 2 to 10 weight-%, based on the weight of the zeolitic material comprised in the second coating.

It is more preferred that the amount of copper, calculated as CuO, comprised in the zeolitic material contained in said second coating is in the range of from 3 to 8 weight-%, more preferably in the range of from 4.5 to 7 weight-%, more preferably in the range of from 4.6 to 6 weight-%, more preferably in the range of from 4.8 to 5.5 weight-%, based on the weight of the zeolitic material comprised in the second coating.

It is also more preferred that the amount of copper, calculated as CuO, comprised in the zeolitic material contained in said second coating is in the range of from 2.5 to 6 weight-%, more preferably in the range of from 3 to 5 weight-%, more preferably in the range of from 3.2 to 4 weight %, based on the weight of the zeolitic material comprised in the second coating.

It is more preferred that, when the zeolitic material comprised in the second coating has a framework type CHA, the amount of copper, calculated as CuO, comprised in the zeolitic material contained in said second coating is in the range of from in the range of from 3 to 8 weight-%, more preferably in the range of from 4.5 to 7 weight-%, more preferably in the range of from 4.6 to 6 weight-%, more preferably in the range of from 4.8 to 5.5 weight-%, based on the weight of the zeolitic material comprised in the second coating.

It is more preferred that, when the zeolitic material comprised in the second coating has a framework type FER or BEA, the amount of copper, calculated as CuO, comprised in the zeolitic material contained in said second coating is in the range of from 2.5 to 6 weight-%, more preferably in the range of from 3 to 5 weight-%, more preferably in the range of from 3.2 to 4 weight-%, based on the weight of the zeolitic material comprised in the second coating.

It is preferred that the second coating further comprises an oxidic component. It is preferred that the oxidic component is one or more of alumina, silica, zirconia, and titania, more preferably one or more of zirconia and alumina, more preferably zirconia.

It is preferred that the amount of the oxidic component, calculated as the oxide, more preferably the amount of zirconia, calculated as $ZrO_2$, is in the range of from 1 to 10 weight-%, more preferably in the range of from 2 to 8 weight-%, more preferably in the range of from 3 to 7 weight %, based on the weight of the zeolitic material comprised in the second coating.

It is preferred that x is in the range of from 90 to 100, more preferably in the range of from 95 to 100, more preferably in the range of from 98 to 100, more preferably in the range of from 99 to 100. It is more preferred that x is in the range of from 98 to 100, more preferably in the range of from 99 to 100, and that z is in the range of from 9 to 40, more preferably in the range of from 10 to 35.

It is preferred that the loading of the second coating is in the range of from 1 to 6 $g/in^3$, more preferably in the range of from 1.5 to 4 $g/in^3$, more preferably in the range of from 1.75 to 3 $g/in^3$.

It is preferred that y is in the range of from 20 to x. It is more preferred that y is in the range of from 20 to 60, more preferably in the range of from 40 to 60. It is alternatively more preferred that y is in the range of from 80 to x, more preferably in the range of from 90 to x, more preferably x=y.

It is more preferred that x is in the range of from 98 to 100, more preferably in the range of from 99 to 100, that y is in the range of from 20 to 60, more preferably in the range of from 40 to 60 and that z is in the range of from 9 to 40, more preferably in the range of from 10 to 35.

It is preferred that the second coating (c) is disposed on the first coating (b) and on the surface of the internal walls of the substrate.

It is preferred that the second coating comprised in the first zone comprises iron in an amount in the range of from 0.5 to 3.5 weight-%, more preferably in the range of from 1 to 3 weight-%, more preferably in the range of from 1.5 to 2.75 weight-%, or more preferably in the range of from 3.1 to 3.3 weight-%, based on the weight of the zeolitic material, which preferably has a framework type CHA.

It is preferred that the second coating comprised in the first zone comprises iron in an amount in the range of from 0.5 to 3.5 weight-%, more preferably in the range of from 0.75 to 3 weight-%, more preferably in the range of from 1 to 2 weight-%, based on the weight of the zeolitic material, which preferably has a framework type FER.

It is preferred that the second coating comprised in the first zone comprises iron in an amount in the range of from 0.5 to 3.5 weight-%, more preferably in the range of from 1 to 3 weight-%, more preferably in the range of from 1.2 to 2 weight-%, based on the weight of the zeolitic material, which preferably has a framework type BEA.

Preferably from 98 to 100 weight-%, more preferably from 99 to 100 weight-%, more preferably from 99.5 to 100 weight-%, more preferably from 99.9 to 100 weight-%, of the second coating comprised in the first zone consist of iron, a zeolitic material comprising copper and more preferably an oxidic component as defined in the foregoing.

It is preferred that the catalyst exhibits two zones. It is more preferred that the first zone is free of the first coating.

It is preferred that $x>y$.

As to the second coating comprised in the second zone, it is preferred that from 0 to 0.001 weight-%, more preferably from 0 to 0.0001 weight-%, more preferably from 0 to 0.00001 weight-%, of the second coating comprised in the second zone consist of iron, calculated as $Fe_2O_3$. In other words, it is preferred that the second coating comprised in the second zone is substantially free of iron, more preferably free of iron.

It is preferred that from 98 to 100 weight-%, more preferably from 99 to 100 weight-%, more preferably from 99.5 to 100 weight-%, more preferably from 99.9 to 100 weight-%, of the second coating comprised in the second zone consist of a zeolitic material comprising copper and more preferably an oxidic component as defined in the foregoing.

As to the second coating, it is preferred that from 0 to 0.001 weight-%, more preferably from 0 to 0.0001 weight-%, more preferably from 0 to 0.00001 weight-%, of the second coating consist of vanadium. In other words, it is preferred that the second coating is substantially free of vanadium, more preferably free of vanadium.

As to the second coating, it is preferred that from 0 to 0.001 weight-%, more preferably from 0 to 0.0001 weight-%, more preferably from 0 to 0.00001 weight-%, of the second coating consist of any platinum group metals. In other words, it is preferred that the second coating is substantially free of any platinum group metals, more preferably free of any platinum group metals.

As to the substrate (a), it is preferred that it is a flow-through substrate or a wall-flow filter substrate, more preferably a flow-through substrate.

It is preferred that the substrate (a) comprises, more preferably consists of, a ceramic substance, wherein the ceramic substance more preferably comprises, more preferably consists of, one or more of an alumina, a silica, a silicate, an aluminosilicate, a cordierite, a mullite, an aluminotitanate, a silicon carbide, a zirconia, a magnesia, more preferably a spinel, and a titania, more preferably one or more of a silicon carbide and a cordierite. It is more preferred that the ceramic substance comprises, more preferably consists of, a cordierite.

It is preferred that the catalyst of the present invention consists of the substrate (a), the first coating (b) and the second coating (c).

The present invention further relates to a use of an exhaust gas treatment catalyst according to the present invention for the selective catalytic reduction of NOx and the oxidation of ammonia.

The present invention further relates to a method for the selective catalytic reduction of nitrogen oxides and the oxidation of ammonia, said method comprising
(1) providing the exhaust gas stream, preferably from a diesel engine;
(2) passing the exhaust gas stream provided in (1) through an exhaust gas treatment catalyst according to the present invention.

The present invention further relates to a process for preparing an exhaust gas treatment catalyst according to the present invention, the process comprising
(a) preparing a first aqueous mixture comprising water and an ammonia oxidation catalyst precursor;
(b) disposing the first aqueous mixture obtained according to (i) on the surface of the internal walls of a substrate comprising an inlet end, an outlet end, a substrate axial length extending from the inlet end to the outlet end and a plurality of passages defined by internal walls of the substrate extending therethrough, over z % of the substrate axial length from the outlet end to the inlet end of the substrate, wherein z is in the range of from 5 to 100; calcining the substrate having the first aqueous mixture disposed thereon, obtaining a substrate comprising a first coating;
(c) preparing a second aqueous mixture comprising water and a zeolitic material comprising copper;
(d) disposing the second aqueous mixture obtained according to (c) on the substrate obtained according to (b), over x % of the substrate axial length from the inlet end to the outlet end of the substrate, wherein x is in the range of from 80 to 100; calcining the substrate having the second aqueous mixture disposed thereon, obtaining a substrate comprising a first coating and a second coating comprising a zeolitic material comprising copper;
(e) preparing a third aqueous mixture comprising water and an iron salt;
(f) disposing the third aqueous mixture obtained according to (e) on the substrate obtained according to (d) over y % of the substrate axial length from the inlet end to the outlet end of the substrate, wherein y is in the range of from 10 to x, obtaining a substrate comprising, in a first zone, the second coating comprising over y % of the substrate axial length an iron salt and a zeolitic material comprising copper; and, if $x>y$, in a second zone extending from y % to x % of the substrate axial length from the inlet end to the outlet end, the second coating comprising a zeolitic material comprising copper;
(g) calcining the substrate obtained according to (f).

In the context of the present invention, it is noted that it is conceivable that the disposal of the second aqueous mixture obtained according to (d) could be performed from the outlet end to the inlet end of the substrate, preferably when the second aqueous mixture is disposed over the entire length of the substrate.

It is preferred that the ammonia oxidation catalyst precursor comprises a source of a platinum group metal component, more preferably a source of platinum or palladium, more preferably a source of platinum, more preferably a platinum salt.

It is more preferred that the ammonia oxidation catalyst precursor further comprises a non-zeolitic oxidic material, wherein the non-zeolitic oxidic material more preferably comprises one or more of alumina, silica, titania, and zirconia, more preferably one or more of alumina, silica and titania, more preferably one or more of alumina and silica. It is more preferred that the non-zeolitic oxidic material comprises, more preferably consists of, alumina.

As to (a), it is preferred that it comprises (a.1) impregnating the source of a platinum group metal component on the non-zeolitic oxidic material;

(a.2) calcining the impregnated non-zeoltic oxidic material obtained according to (a.1);

(a.3) admixing water with the calcined impregnated non-zeoltic oxidic material obtained according to (a.2).

It is preferred that the substrate provided in (b) is a flow-through substrate or a wall-flow filter substrate, more preferably a flow-through substrate.

It is preferred that the substrate provided in (b) comprises, more preferably consists of, a ceramic substance, wherein the ceramic substance more preferably comprises, more preferably consists of, one or more of an alumina, a silica, a silicate, an aluminosilicate, a cordierite, a mullite, an aluminotitanate, a silicon carbide, a zirconia, a magnesia, more preferably a spinel, and a titania, more preferably one or more of a silicon carbide and a cordierite. It is more preferred that the ceramic substance more preferably comprises, more preferably consists of, a cordierite. It is preferred that z is in the range of from 7 to 70, more preferably in the range of from 8 to 50, more preferably in the range of from 9 to 40, more preferably in the range of from 10 to 35.

It is preferred that, prior to calcining according to (b), the substrate having the first aqueous mixture disposed thereon is dried in a gas atmosphere having a temperature in the range of from 90 to 250° C., more preferably in the range of from 100 to 150° C., the gas atmosphere more preferably being air.

It is preferred that drying is performed in a gas atmosphere for a duration in the range of from 10 to 360 minutes, more preferably in the range of from 20 to 240 minutes, the gas atmosphere more preferably being air.

It is preferred that calcining the substrate having the first aqueous mixture disposed thereon according to (b) is performed in a gas atmosphere having a temperature in the range of from 400 to 900° C., the gas atmosphere more preferably being air.

It is preferred that calcining the substrate having the first aqueous mixture disposed thereon according to (b) is performed in a gas atmosphere for a duration in the range of from 5 to 360 minutes, the gas atmosphere more preferably comprising, more preferably consisting of, air.

Preferably from 98 to 100 weight-%, more preferably from 99 to 100 weight-%, more preferably from 99.5 to 100 weight-%, more preferably from 99.9 to 100 weight-%, of the first aqueous mixture prepared according to (a) consist of water, the source of a platinum group metal component and the non-zeolitic oxidic material.

As to the second aqueous mixture prepared according to (c), it is preferred that the zeolitic material comprising copper contained therein has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEl, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEl, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof.

It is more preferred that the zeolitic material comprising copper contained in the second aqueous mixture prepared according to (c) has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI. It is more preferred that the zeolitic material comprising copper contained in the second aqueous mixture prepared according to (c) has a framework type CHA.

Alternatively, it is more preferred that the zeolitic material comprising copper contained in the second aqueous mixture prepared according to (c) has a framework type selected from the group consisting of FER, BEA, MFI, FAU, MOR, a mixture of two or more thereof and a mixed type of two or more thereof, more preferably selected from the group consisting of FER, BEA, MFI, FAU, a mixture of two or more thereof and a mixed type of two or more thereof. It is more preferred that said zeolitic material comprising copper contained in the second aqueous mixture prepared according to (c) has a framework type FER or BEA.

Preferably from 95 to 100 weight-%, more preferably from 98 to 100 weight-%, more preferably from 99 to 100 weight-%, of the framework structure of the zeolitic material consist of Si, Al, 0, and optionally H. It is preferred that, in the framework structure, the molar ratio of Si to Al, calculated as molar $SiO_2:Al_2O_3$, more preferably is in the range of from 2:1 to 50:1, more preferably in the range of from 5:1 to 45:1, more preferably in the range of from 7:1 to 35:1, more preferably in the range of from 10:1 to 30:1, more preferably in the range of from 15:1 to 22:1 or more preferably in the range of from 24:1 to 30:1.

It is more preferred that, when the zeolitic material contained in the second aqueous mixture prepared according to (c) has a framework type CHA or FER, the molar ratio of Si to Al, calculated as molar $SiO_2:Al_2O_3$, is in the range of from 15:1 to 22:1. Further, it is more preferred that, when the zeolitic material contained in the second aqueous mixture prepared according to (c) has a framework type BEA, the molar ratio of Si to Al, calculated as molar $SiO_2:Al_2O_3$, is in the range of 24:1 to 30:1.

It is preferred that the zeolitic material contained in the second aqueous mixture prepared according to (c), more preferably which has a framework type CHA, has a mean crystallite size of at least 0.1 micrometer, preferably in the range of from 0.1 to 3.0 micrometers, more preferably in the range of from 0.3 to 1.5 micrometers, more preferably in the range of from 0.4 to 1.0 micrometer determined via scanning electron microscopy.

It is preferred that the zeolitic material comprised in the second aqueous mixture prepared according to (c) has a BET specific surface area in the range of from 300 to 800 $m^2/g$, the BET specific surface area being determined as described in Reference Example 1.

It is more preferred that the zeolitic material, more preferably having a framework type CHA, comprised in the first aqueous mixture prepared according to (i) has a BET specific surface area in the range of from 400 to 700 $m^2/g$, more preferably in the range of from 500 to 630 $m^2/g$, the BET specific surface area being determined as described in Reference Example 1.

It is more preferred that the zeolitic material, more preferably having a framework type FER, comprised in the first aqueous mixture prepared according to (i) has a BET specific surface area in the range of from 300 to 500 $m^2/g$, the BET specific surface area being determined as described in Reference Example 1.

It is more preferred that the zeolitic material, more preferably having a framework type BEA, comprised in the first aqueous mixture prepared according to (i) has a BET specific surface area in the range of from 600 to 800 $m^2/g$, the BET specific surface area being determined as described in Reference Example 1.

It is preferred that the amount of copper, calculated as CuO, comprised in the zeolitic material contained in the second aqueous mixture prepared according to (c) is in the range of from 1.5 to 15 weight-%, more preferably in the range of from 2 to 10 weight-%, based on the weight of the zeolitic material comprised in the second aqueous mixture prepared according to (c).

it is more preferred that the amount of copper, calculated as CuO, comprised in the zeolitic material contained in the second aqueous mixture prepared according to (c) is in the range of from 3 to 8 weight-%, more preferably in the range of from 4.5 to 7 weight-%, more preferably in the range of from 4.6 to 6 weight-%, more preferably in the range of from 4.8 to 5.5 weight-%, based on the weight of the zeolitic material comprised in the second aqueous mixture prepared according to (c).

It is also more preferred that the amount of copper, calculated as CuO, comprised in the zeolitic material contained in the second aqueous mixture prepared according to (c) is in the range of from 2.5 to 6 weight-%, more preferably in the range of from 3 to 5 weight-%, more preferably in the range of from 3.2 to 4 weight-%, based on the weight of the zeolitic material contained in the second aqueous mixture prepared according to (c).

It is more preferred that, when the zeolitic material contained in the second aqueous mixture prepared according to (c) has a framework type CHA, the amount of copper, calculated as CuO, comprised in the zeolitic material contained in said second coating is in the range of from in the range of from 3 to 8 weight-%, more preferably in the range of from 4.5 to 7 weight-%, more preferably in the range of from 4.6 to 6 weight-%, more preferably in the range of from 4.8 to 5.5 weight-%, based on the weight of the zeolitic material comprised in the second aqueous mixture prepared according to (c).

It is more preferred that, when the zeolitic material contained in the second aqueous mixture prepared according to (c) has a framework type FER or BEA, the amount of copper, calculated as CuO, comprised in the zeolitic material contained in said second coating is in the range of from 2.5 to 6 weight-%, more preferably in the range of from 3 to 5 weight-%, more preferably in the range of from 3.2 to 4 weight-%, based on the weight of the zeolitic material comprised in the second aqueous mixture prepared according to (c).

It is preferred that the second aqueous mixture prepared according to (c) further comprises a precursor of an oxidic component, wherein the precursor more preferably is one or more of an aluminum salt, a silicon salt, a zirconium salt, and a titanium salt, more preferably one or more of a zirconium salt, and an aluminum salt, more preferably a zirconium salt. It is more preferred that the precursor be zirconium acetate.

It is preferred that, in the second aqueous mixture prepared according to (c), the amount of the precursor of the oxidic component, calculated as the oxide, more preferably as alumina, silica, zirconia or titania, more preferably the amount of the zirconium salt, calculated as $ZrO_2$, is in the range of from 1 to 10 weight-%, more preferably in the range of from 2 to 8 weight-%, more preferably in the range of from 3 to 7 weight-%, based on the weight of the zeolitic material comprised in the second aqueous mixture prepared according to (c).

It is preferred that the water comprised in the second aqueous mixture prepared according to (c) is deionized water.

It is preferred that the second aqueous mixture prepared according to (c) comprises at most 1000 ppm, more preferably from 0 to 100 ppm, more preferably from 0 to 10 ppm of iron, calculated as elemental iron. In other words, it is preferred that the second aqueous mixture prepared according to (c) is substantially free of iron, more preferably free of iron.

Preferably from 98 to 100 weight-%, more preferably from 99 to 100 weight-%, more preferably from 99.5 to 100 weight-%, more preferably from 99.9 to 100 weight-%, of the second aqueous mixture prepared according to (c) consist of water, the zeolitic material comprising copper, and more preferably a precursor of an oxide as defined in the foregoing.

It is preferred that, after preparing a second aqueous mixture according to (c) and prior to disposing said mixture on the substrate obtained according to (b), the second aqueous mixture is milled or mixed, more preferably until the particles of the second aqueous mixture have a Dv90 in the range of from 3 to 20 micrometers, more preferably in the range of from 5 to 15 micrometers, more preferably in the range of from 6 to 8 micrometers or more preferably in the range of from 9 to 12 micrometers, the Dv90 being determined as described in Reference Example 2.

It is preferred that x is in the range of from 90 to 100, more preferably in the range of from 95 to 100, more preferably in the range of from 98 to 100, more preferably in the range of from 99 to 100.

It is preferred that, prior to calcining according to (d), the substrate having the second aqueous mixture disposed thereon is dried in a gas atmosphere having a temperature in the range of from 90 to 250° C., more preferably in the range of from 100 to 150° C., the gas atmosphere more preferably being air.

It is preferred that drying is performed in a gas atmosphere for a duration in the range of from 10 to 360 minutes, more preferably in the range of from 20 to 240 minutes, more preferably in the range of from 30 to 90 minutes, the gas atmosphere more preferably being air.

It is preferred that calcining the substrate having the second aqueous mixture disposed thereon according to (d) is performed in a gas atmosphere having a temperature in the range of from 400 to 800° C., more preferably in the range of from 500 to 700° C., more preferably in the range of from 550 to 650° C., the gas atmosphere more preferably being air.

As to calcining the substrate having the second aqueous mixture disposed thereon according to (d), it is preferred that it is performed in a gas atmosphere for a duration in the range of from 5 to 360 minutes, more preferably in the range of from 20 to 240 minutes, more preferably in the range of from 30 to 90 minutes, the gas atmosphere more preferably comprising, more preferably consisting of, air.

It is preferred that the substrate comprising the second coating comprising a zeolitic material comprising copper obtained according to (d) has a water adsorption, expressed in weight of $H_2O$ relative to the volume of the second coating, in the range of from 1 to 5 $g/in^3$, more preferably in the range of from 1.5 to 4 $g/in^3$, more preferably in the range of from 2 to 3.5 $g/in^3$, the water adsorption being determined as defined in Reference Example 5.

It is preferred that the iron salt comprised in the third aqueous mixture prepared according to (e) is one or more of iron (III) nitrate, iron (II) acetate, ammonium iron (III) citrate, iron (II) sulfate, and iron (II) oxalate, more preferably iron (III) nitrate, more preferably iron (III) nitrate nonahydrate.

As to the third aqueous mixture prepared according to (e), it is preferred that it comprises the iron salt in an amount, calculated as $Fe_2O_3$, which is in the range of from 4 to 40 weight-%, more preferably in the range of from 7 to 30 weight-%, more preferably in the range of from 10 to 25 weight-%, more preferably in the range of from 13 to 22 weight-%, more preferably in the range of from 15 to 20 weight-%, based on the weight of the third aqueous mixture prepared according to (e).

It is preferred that the water comprised in the third aqueous mixture prepared according to (e) is deionized water.

Preferably from 98 to 100 weight-%, more preferably from 99 to 100 weight-%, more preferably from 99.5 to 100 weight-%, more preferably from 99.9 to 100 weight-%, of the third aqueous mixture prepared according to (e) consist of water and the iron salt.

It is preferred that according to (f) disposing the third aqueous mixture obtained according to (e) on the substrate obtained according to (d) comprises dipping the substrate comprising the second coating comprising a zeolitic material comprising copper obtained according to (d) into the third aqueous mixture prepared according to (e), more preferably for a duration in the range of from 5 to 120 seconds, more preferably in the range of from 7 to 80 seconds, more preferably in the range of from 9 to 60 seconds, more preferably in the range of from 10 to 50 seconds.

It is preferred that y is in the range of from 20 to x. It is more preferred that y is in the range of from 20 to 60, more preferably in the range of from 40 to 60. It is alternatively more preferred that y is in the range of from 80 to x, more preferably in the range of from 90 to x, more preferably x=y.

It is preferred that, prior to calcining according to (g), the substrate obtained in (f) is dried in a gas atmosphere having a temperature in the range of from 80 to 250° C., more preferably in the range of from 90 to 200° C., more preferably in the range of from 100 to 150° C., more preferably in the range of from 110 to 130° C.

It is preferred that drying is performed in a gas atmosphere for a duration in the range of from 10 to 180 minutes, more preferably in the range of from 20 to 120 minutes, more preferably in the range of from 30 to 90 minutes, more preferably in the range of from 40 to 80 minutes.

As to the gas atmosphere, it is preferred that it comprises, more preferably consists of, air.

It is preferred that calcining according to (g) is performed in a gas atmosphere having a temperature in the range of from 400 to 800° C., more preferably in the range of from 450 to 700° C., more preferably in the range of from 500 to 650° C., more preferably in the range of from 550 to 650° C.

It is preferred that calcining according to (g) is performed in a gas atmosphere for a duration in the range of from 10 to 180 minutes, more preferably in the range of from 20 to 120 minutes, more preferably in the range of from 30 to 90 minutes, more preferably in the range of from 40 to 80 minutes.

As to the gas atmosphere, it is preferred that it comprises, more preferably consists of, air.

It is preferred that the process of the present invention consists of (a), (b), (c), (d), (e), (f) and (g).

The present invention is further illustrated by the following first set of embodiments and combinations of embodiments resulting from the dependencies and back-references as indicated. In particular, it is noted in the context of the present invention, that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4". Further, it is explicitly noted that the following set of embodiments is not the set of claims determining the extent of protection, but represents a suitably structured part of the description directed to general and preferred aspects of the present invention. It is noted that this is applicable as well for the second set of embodiments.

1. A process for preparing a catalyst for the selective catalytic reduction of nitrogen oxide comprising a coating comprising iron and a zeolitic material comprising copper, the process comprising (i) preparing a first aqueous mixture comprising water and a zeolitic material comprising copper;

(ii) disposing the first aqueous mixture obtained according to (i) on the surface of the internal walls of a substrate comprising an inlet end, an outlet end, a substrate axial length extending from the inlet end to the outlet end and a plurality of passages defined by internal walls of the substrate extending therethrough, over x % of the substrate axial length from the inlet end to the outlet end of the substrate, wherein x is in the range of from 80 to 100; calcining the substrate having the first aqueous mixture disposed thereon, obtaining a substrate comprising a coating comprising a zeolitic material comprising copper;

(iii) preparing a second aqueous mixture comprising water and an iron salt;

(iv) disposing the second aqueous mixture obtained according to (iii) on the substrate obtained according to (ii) over y % of the substrate axial length from the inlet end to the outlet end of the substrate, wherein y is in the range of from 10 to x, obtaining a substrate comprising, in a first zone, the coating comprising a zeolitic material comprising copper and over y % of the substrate axial length an iron salt; and, if x>y, in a second zone extending from y % to x % of the substrate axial length from the inlet end to the outlet end, the coating comprising a zeolitic material comprising copper;

(v) calcining the substrate obtained according to (iv).

2. The process of embodiment 1, wherein the zeolitic material comprising copper contained in the aqueous mixture prepared according to (i) has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEl, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEl, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, wherein the zeolitic material comprising copper contained in the first aqueous mixture prepared according to (i) more preferably has a framework type CHA, or preferably selected from the group consisting of FER, BEA, MEl, FAU, MOR, a mixture of two or more thereof and a mixed type of two or more thereof, more preferably selected from the group consisting of FER, BEA, MEl, FAU, a mixture of two or more thereof and a mixed type of two or more thereof, wherein the zeolitic material comprising copper contained in the first aqueous mixture prepared according to (i) more preferably has a framework type FER or BEA.

3. The process of embodiment 2, wherein from 95 to 100 weight-%, preferably from 98 to 100 weight-%, more preferably from 99 to 100 weight-%, of the framework structure of the zeolitic material consist of Si, Al, 0, and optionally H, wherein in the framework structure, the molar ratio of Si to Al, calculated as molar $SiO_2:Al_2O_3$, preferably is in the range of from 2:1 to 50:1, more preferably in the range of from 5:1 to 45:1, more preferably in the range of from 7:1 to 35:1, more preferably in the range of from 10:1 to 30:1, more preferably in the range of from 15:1 to 22:1 or more preferably in the range of from 24:1 to 30:1.

4. The process of any one of embodiments 1 to 3, wherein the zeolitic material contained in the first aqueous mixture prepared according to (i), preferably which has a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.

5. The process of any one of embodiments 1 to 4, wherein the zeolitic material comprised in the first aqueous mixture prepared according to (i), preferably which has a framework type CHA, has a BET specific surface area in the range of from 300 to 800 $m^2/g$, the BET specific surface area being determined as described in Reference Example 1.

6. The process of embodiment 5, wherein the zeolitic material comprised in the first aqueous mixture prepared according to (i), preferably having a framework type CHA, has a BET specific surface area in the range of from 400 to 700 $m^2/g$, preferably in the range of from 500 to 630 $m^2/g$, the BET specific surface area being determined as described in Reference Example 1.

7. The process of any one of embodiments 1 to 6, wherein the amount of copper, calculated as CuO, comprised in the zeolitic material contained in the first aqueous mixture prepared according to (i) is in the range of from 1.5 to 15 weight-%, preferably in the range of from 2 to 10 weight-%, based on the weight of the zeolitic material comprised in the first aqueous mixture prepared according to (i), wherein the amount of copper, calculated as CuO, comprised in the zeolitic material contained in the first aqueous mixture prepared according to (i) is more preferably in the range of from 3 to 8 weight-%, more preferably in the range of from 4.5 to 7 weight-%, more preferably in the range of from 4.6 to 6 weight-%, more preferably in the range of from 4.8 to 5.5 weight-%, based on the weight of the zeolitic material comprised in the first aqueous mixture prepared according to (i), or more preferably in the range of from 3.2 to 4 weight-%, based on the weight of the zeolitic material comprised in the first aqueous mixture prepared according to (i).

8. The process of any one of embodiments 1 to 7, wherein the first aqueous mixture prepared according to (i) further comprises a precursor of an oxidic component, wherein the precursor preferably is one or more of an aluminum salt, a silicon salt, a zirconium salt, and a titanium salt, more preferably one or more of a zirconium salt, and an aluminum salt, more preferably a zirconium salt, more preferably zirconium acetate.

9. The process of embodiment 8, wherein in the first aqueous mixture prepared according to (i), the amount of the precursor of the oxidic component, calculated as the oxide, preferably as alumina, silica, zirconia or titania, preferably the amount of the zirconium salt, calculated as $ZrO_2$, is in the range of from 1 to 10 weight-%, preferably in the range of from 2 to 8 weight-%, more preferably in the range of from 3 to 7 weight-%, based on the weight of the zeolitic material comprised in the first aqueous mixture prepared according to (i).

10. The process of any one of embodiments 1 to 9, wherein the water comprised in the first aqueous mixture prepared according to (i) is deionized water.

11. The process of any one of embodiments 1 to 10, wherein the first aqueous mixture prepared according to (i) comprises at most 1000 ppm, preferably from 0 to 100 ppm, more preferably from 0 to 10 ppm of iron, calculated as elemental iron.

12. The process of any one of embodiments 1 to 11, wherein from 98 to 100 weight-%, preferably from 99 to 100 weight-%, more preferably from 99.5 to 100 weight-%, more preferably from 99.9 to 100 weight-%, of the first aqueous mixture prepared according to (i) consist of water, the zeolitic material comprising copper, and preferably a precursor of an oxide as defined in embodiment 8 or 9.

13. The process of any one of embodiments 1 to 12, wherein after preparing a first aqueous mixture according to (i) and prior to disposing said mixture on the substrate according to (ii), the first aqueous mixture is milled or mixed, preferably until the particles of the first aqueous mixture have a Dv90 in the range of from 3 to 20 micrometers, more preferably in the range of from 5 to 15 micrometers, more preferably 6 to 8 micrometers or more preferably in the range of from 9 to 12 micrometers, the Dv90 being determined as described in Reference Example 2.

14. The process of any one of embodiments 1 to 13, wherein the substrate provided in (ii) is a flow-through substrate or a wall-flow filter substrate, preferably a flow-through substrate.

15. The process of any one of embodiments 1 to 14, wherein the substrate provided in (ii) comprises, preferably consists of, a ceramic substance, wherein the ceramic substance preferably comprises, more preferably consists of, one or more of an alumina, a silica, a silicate, an aluminosilicate, a cordierite, a mullite, an aluminotitanate, a silicon carbide, a zirconia, a magnesia, more preferably a spinel, and a titania, more preferably one or more of a silicon carbide and a cordierite, more preferably a cordierite.

16. The process of any one of embodiments 1 to 15, wherein x is in the range of from 90 to 100, preferably in the range of from 95 to 100, more preferably in the range of from 98 to 100, more preferably in the range of from 99 to 100.

17. The process of any one of embodiments 1 to 16, wherein prior to calcining according to (ii), the substrate having the first aqueous mixture disposed thereon is dried in a gas atmosphere having a temperature in the range of from 90 to 250° C., preferably in the range of from 100 to 150° C., the gas atmosphere more preferably being air;
wherein drying preferably is performed for a duration in the range of from 10 to 360 minutes, more preferably in the range of from 20 to 240 minutes, more preferably in the range of from 30 to 90 minutes.

18. The process of any one of embodiments 1 to 17, wherein calcining the substrate having the first aqueous mixture disposed thereon according to (ii) is performed in a gas atmosphere having a temperature in the range of from 400 to 800° C., preferably in the range of from 500 to 700° C., more preferably in the range of from 550 to 650° C., the gas atmosphere more preferably being air.

19. The process of any one of embodiments 1 to 18, wherein calcining the substrate having the first aqueous mixture disposed thereon according to (ii) is performed in a gas atmosphere for a duration in the range of from 5 to 360 minutes, preferably in the range of from 20 to 240 minutes, more preferably in the range of from 30 to 90 minutes, the gas atmosphere more preferably comprising, more preferably consisting of, air.

20. The process of any one of embodiments 1 to 19, wherein the substrate comprising the coating comprising a zeolitic material comprising copper obtained according to (ii) has a water adsorption, expressed in weight of $H_2O$ relative to the volume of the coating, in the range of from 1 to 5 g/in$^3$, preferably in the range of from 1.5 to 4 g/in$^3$, more preferably in the range of from 2 to 3.5 g/in$^3$, the water adsorption being determined as defined in Reference Example 5.

21. The process of any one of embodiments 1 to 20, wherein the iron salt comprised in the second aqueous mixture prepared according to (iii) is one or more of iron (III) nitrate, iron (II) acetate, ammonium iron (III) citrate, iron (II) sulfate, and iron (II) oxalate, preferably iron (III) nitrate, more preferably iron (III) nitrate nonahydrate.

22. The process of any one of embodiments 1 to 21, wherein the second aqueous mixture prepared according to (iii) comprises the iron salt in an amount, calculated as $Fe_2O_3$, which is in the range of from 4 to 40 weight-%, preferably in the range of from 7 to 30 weight-%, more preferably in the range of from 10 to 25 weight-%, more preferably in the range of from 13 to 22 weight-%, more preferably in the range of from 15 to 20 weight-%, based on the weight of the second aqueous mixture prepared according to (iii).

23. The process of any one of embodiments 1 to 22, wherein the water comprised in the second aqueous mixture prepared according to (iii) is deionized water.

24. The process of any one of embodiments 1 to 23, wherein from 98 to 100 weight-%, preferably from 99 to 100 weight-%, more preferably from 99.5 to 100 weight-%, more preferably from 99.9 to 100 weight-%, of the second aqueous mixture prepared according to (iii) consist of water and the iron salt.

25. The process of any one of embodiments 1 to 24, wherein according to (iv) disposing the second aqueous mixture obtained according to (iii) on the substrate obtained according to (ii) comprises dipping the substrate comprising the coating comprising a zeolitic material comprising copper obtained according to (ii) into the second aqueous mixture prepared according to (iii), preferably for a duration in the range of from 5 to 120 seconds, more preferably in the range of from 7 to 80 seconds, more preferably in the range of from 9 to 60 seconds, more preferably in the range of from 10 to 50 seconds.

26. The process of any one of embodiments 1 to 25, wherein y is in the range of from 20 to x, preferably in the range of from 20 to 60, more preferably in the range of from 40 to 60, or preferably in the range of from 80 to x, more preferably in the range of from 90 to x, more preferably x=y.

27. The process of any one of embodiments 1 to 26, wherein prior to calcining according to (v), the substrate obtained in (iv) is dried in a gas atmosphere having a temperature in the range of from 80 to 250° C., preferably in the range of from 90 to 200° C., more preferably in the range of from 100 to 150° C., more preferably in the range of from 110 to 130° C.

28. The process of embodiment 27, wherein drying is performed in a gas atmosphere for a duration in the range of from 10 to 180 minutes, preferably in the range of from 20 to 120 minutes, more preferably in the range of from 30 to 90 minutes, more preferably in the range of from 40 to 80 minutes.

29. The process of embodiment 27 or 28, wherein the gas atmosphere comprises, preferably consists of, air.

30. The process of any one of embodiments 1 to 29, wherein calcining according to (v) is performed in a gas atmosphere having a temperature in the range of from 400 to 800° C., preferably in the range of from 450 to 700° C., more preferably in the range of from 500 to 650° C., more preferably in the range of from 550 to 650° C.

31. The process of any one of embodiments 1 to 30, wherein calcining according to (v) is performed in a gas atmosphere for a duration in the range of from 10 to 180 minutes, preferably in the range of from 20 to 120 minutes, more preferably in the range of from 30 to 90 minutes, more preferably in the range of from 40 to 80 minutes.

32. The process of embodiment 30 or 31, wherein the gas atmosphere comprises, preferably consists of, air.

33. The process of any one of embodiments 1 to 32, consisting of (i), (ii), (iii), (iv) and (v).

34. A catalyst for the selective catalytic reduction of nitrogen oxide, preferably obtainable or obtained by a process according to any one of embodiments 1 to 33, comprising
(a) a substrate comprising an inlet end, an outlet end, a substrate axial length extending from the inlet end to the outlet end and a plurality of passages defined by internal walls of the substrate extending therethrough;
(b) a coating disposed on the surface of the internal walls of the substrate (a) over x % of the substrate axial length, from the inlet end to the outlet end of the substrate (a), wherein x is in the range of from 80 to 100, the coating comprising a zeolitic material comprising copper;
wherein the catalyst exhibits one or more zones:
(b.1) a first zone extending over y % of the substrate axial length, from the inlet end to the outlet end of the substrate (a), wherein y is in the range of from 10 to x; wherein the first zone comprises the coating comprising the zeolitic material comprising copper, wherein, in said zone, the coating further comprises iron;
(b.2) if x>y, a second zone extending from y % to x % of the substrate axial length from the inlet end to the outlet end of the substrate (a), wherein the second zone comprises the coating comprising a zeolitic material comprising copper.

35. The catalyst of embodiment 34, wherein the zeolitic material comprising copper contained in the coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEl, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEl, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, wherein the zeolitic material comprising copper contained in the coating more preferably has a framework type CHA; or preferably selected from the group consisting of FER, BEA, MFI, FAU, MOR, a mixture of two or more thereof and a mixed type of two or more thereof, more preferably selected from the group consisting of FER, BEA, MFI, FAU, a mixture of two or more thereof and a mixed type of two or more thereof, wherein the zeolitic material comprising copper contained in the coating more preferably has a framework type FER or BEA.

36. The catalyst of embodiment 34 or 35, wherein from 95 to 100 weight-%, preferably from 98 to 100 weight-%, more preferably from 99 to 100 weight-%, of the framework structure of the zeolitic material consist of Si, Al, 0, and optionally H, wherein in the framework structure, the molar ratio of Si to Al, calculated as molar $SiO_2:Al_2O_3$, preferably is in the range of from 2:1 to 50:1, more preferably in the range of from 5:1 to 45:1, more preferably in the range of from 7:1 to 35:1, more preferably in the range of from 10:1 to 30:1, more preferably in the range of from 15:1 to 22:1 or more preferably in the range of from 24:1 to 30:1.

37. The catalyst of any one of embodiments 34 to 36, wherein the zeolitic material contained in the coating, preferably which has a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.

38. The catalyst of any one of embodiments 34 to 37, wherein the amount of copper, calculated as CuO, comprised in the zeolitic material contained in the coating is in the range of from 1.5 to 15 weight-%, preferably in the range of from 2 to 10 weight-%, based on the weight of the zeolitic material comprised in the coating;

wherein the amount of copper, calculated as CuO, comprised in the zeolitic material contained in the coating is more preferably in the range of from 3 to 8 weight-%, more preferably in the range of from 4.5 to 7 weight-%, more preferably in the range of from 4.6 to 6 weight-%, more preferably in the range of from 4.8 to 5.5 weight-%, based on the weight of the zeolitic material comprised in the coating; or more preferably in the range of from 3.2 to 4 weight-%, based on the weight of the zeolitic material comprised in the coating.

39. The catalyst of any one of embodiments 34 to 38, wherein the coating further comprises an oxidic component, wherein the oxidic component preferably is one or more of alumina, silica, zirconia, and titania, more preferably one or more of zirconia and alumina, more preferably zirconia.

40. The catalyst of embodiment 39, wherein the amount of the oxidic component, calculated as the oxide, preferably the amount of zirconia, calculated as $ZrO_2$, is in the range of from 1 to 10 weight-%, preferably in the range of from 2 to 8 weight-%, more preferably in the range of from 3 to 7 weight-%, based on the weight of the zeolitic material comprised in the coating.

41. The catalyst of any one of embodiments 34 to 40, wherein x is in the range of from 90 to 100, preferably in the range of from 95 to 100, more preferably in the range of from 98 to 100, more preferably in the range of from 99 to 100.

42. The catalyst of any one of embodiments 34 to 41, wherein the loading of the coating is in the range of from 1 to 6 g/in³, preferably in the range of from 1.5 to 4 g/in³, more preferably in the range of from 1.75 to 3 g/in³.

43. The catalyst of any one of embodiments 34 to 42, wherein y is in the range of from 20 to x, preferably in the range of from 20 to 60, more preferably in the range of from 40 to 60, or preferably in the range of from 80 to x, more preferably in the range of from 90 to x, more preferably x=y.

44. The catalyst of any one of embodiments 34 to 43, wherein the coating comprised in the first zone comprises iron in an amount in the range of from 0.5 to 3.5 weight-%, preferably in the range of from 1 to 3 weight-%, more preferably in the range of from 1.5 to 2.5 weight-%, or preferably in the range of from 3.1 to 3.3 weight-%, based on the weight of the zeolitic material, which preferably has a framework type CHA.

45. The catalyst of any one of embodiments 34 to 44, wherein from 98 to 100 weight-%, preferably from 99 to 100 weight-%, more preferably from 99.5 to 100 weight-%, more preferably from 99.9 to 100 weight-%, of the coating comprised in the first zone consist of iron, a zeolitic material comprising copper and preferably an oxidic component as defined in embodiment 39 or 40.

46. The catalyst of any one of embodiments 34 to 45, wherein the catalyst exhibits two zones.

47. The catalyst of any one of embodiments 34 to 46, wherein x>y.

48. The catalyst of embodiment 47, wherein from 0 to 0.001 weight-%, preferably from 0 to 0.0001 weight-%, more preferably from 0 to 0.00001 weight-%, of the coating comprised in the second zone consist of iron, calculated as $Fe_2O_3$.

49. The catalyst of embodiment 47 or 48, wherein from 98 to 100 weight-%, preferably from 99 to 100 weight-%, more preferably from 99.5 to 100 weight-%, more preferably from 99.9 to 100 weight-%, of the coating comprised in the second zone consist of a zeolitic material comprising copper and preferably an oxidic component as defined in embodiment 39 or 40.

50. The catalyst of any one of embodiments 34 to 49, wherein from 0 to 0.001 weight-%, preferably from 0 to 0.0001 weight-%, more preferably from 0 to 0.00001 weight-%, of the coating consist of vanadium.

51. The catalyst of any one of embodiments 34 to 50, wherein from 0 to 0.001 weight-%, preferably from 0 to 0.0001 weight-%, more preferably from 0 to 0.00001 weight-%, of the coating consist of any platinum group metals.

52. The catalyst of any one of embodiments 34 to 51, wherein the substrate (a) is a flowthrough substrate or a wall-flow filter substrate, preferably a flow-through substrate.

53. The catalyst of any one of embodiments 34 to 52, wherein the substrate (a) comprises, preferably consists of, a ceramic substance, wherein the ceramic substance preferably comprises, more preferably consists of, one or more of an alumina, a silica, a silicate, an alumino-silicate, a cordierite, a mullite, an aluminotitanate, a silicon carbide, a zirconia, a magnesia, more preferably a spinel, and a titania, more preferably one or more of a silicon carbide and a cordierite.

54. The catalyst of embodiment 53, wherein the ceramic substance comprises, preferably consists of, a cordierite.

55. The catalyst of any one of embodiments 34 to 54, consisting of the substrate (a) and the coating (b).

56. Use of a catalyst according to any one of embodiments 34 to 55 for the selective catalytic reduction of nitrogen oxide, preferably exiting from a diesel engine.

57. A method for the selective catalytic reduction of nitrogen oxides, wherein the nitrogen oxides are comprised in an exhaust gas stream, said method comprising (1) providing the exhaust gas stream, preferably from a diesel engine;

(2) passing the exhaust gas stream provided in (1) through a catalyst for the selective catalytic reduction according to any one of embodiments 34 to 55.

58. An exhaust gas treatment system for the treatment of exhaust gas exiting from an internal combustion engine, preferably from a diesel engine, the system comprising a catalyst for the selective catalytic reduction of nitrogen oxide according to any one of embodiments 34 to 55 and one or more of a diesel oxidation catalyst, an ammonia oxidation catalyst, a selective catalytic reduction catalyst, a catalyzed soot filter and a SCR/AMOx catalyst.

59. The system of embodiment 58 comprising a diesel oxidation catalyst, a catalyzed soot filter and a catalyst for the selective catalytic reduction of nitrogen oxide according to any one of embodiments 34 to 55, wherein the diesel oxidation catalyst is positioned upstream of the catalyzed soot filter and wherein the catalyzed soot filter is positioned upstream of the catalyst for the selective catalytic reduction of nitrogen oxide according to any one of embodiments 34 to 55; wherein the diesel oxidation catalyst preferably is the first catalyst of the system and preferably no catalyst is present between the engine and the diesel oxidation catalyst.

60. The system of embodiment 59, wherein the system further comprises a selective catalytic reduction catalyst which is positioned downstream of the catalyst for the selective catalytic reduction of nitrogen oxide according to any one of embodiments 34 to 55; wherein the system preferably further comprises an ammonia oxidation catalyst, said ammonia oxidation catalyst being positioned downstream of the selective catalytic reduction catalyst.

61. The system of embodiment 59 or 60 further comprising a reductant injector, the reductant injector being positioned downstream of the catalyzed soot filter and upstream of the catalyst for the selective catalytic reduction of nitrogen oxide according to any one of embodiments 34 to 55, wherein the reductant preferably is urea.

62. The system of embodiment 58 comprising a diesel oxidation catalyst, a catalyzed soot filter and a catalyst for the selective catalytic reduction of nitrogen oxide according to any one of embodiments 34 to 55, wherein the diesel oxidation catalyst is positioned upstream of the catalyst for the selective catalytic reduction of nitrogen oxide according to any one of embodiments 34 to 55 and wherein the catalyst for the selective catalytic reduction of nitrogen oxide according to any one of embodiments 34 to 55 is positioned upstream of the catalyzed soot filter; wherein the diesel oxidation catalyst preferably is the first catalyst of the system and preferably no catalyst is present between the engine and the diesel oxidation catalyst.

63. The system of embodiment 62, wherein the system further comprises a selective catalytic reduction catalyst which is positioned downstream of the catalyst for the selective catalytic reduction of nitrogen oxide according to any one of embodiments 34 to 55 and upstream of the catalyzed soot filter;
wherein the system preferably further comprises an ammonia oxidation catalyst, said ammonia oxidation catalyst being positioned downstream of the selective catalytic reduction catalyst and upstream of the catalyzed soot filter.

64. The system of embodiment 62 or 63, wherein the system further comprises a SCR/AMOx catalyst positioned downstream of the catalyzed soot filter, wherein the system preferably further comprises a reductant injector positioned upstream of the SCR/AMOx catalyst and downstream of the catalyzed soot filter, the reductant more preferably being urea.

65. The system of any one of embodiments 62 to 64 further comprising a reductant injector, the reductant injector being positioned downstream of the diesel oxidation catalyst and upstream of the catalyst for the selective catalytic reduction of nitrogen oxide according to any one of embodiments 34 to 55, wherein the reductant preferably is urea.

66. The system of embodiment 58 comprising a catalyst for the selective catalytic reduction of nitrogen oxide according to any one of embodiments 34 to 55 and a catalyzed soot filter, wherein the catalyst for the selective catalytic reduction of nitrogen oxide according to any one of embodiments 34 to 55 is positioned upstream of the catalyzed soot filter; wherein the catalyst for the selective catalytic reduction of nitrogen oxide according to any one of embodiments 34 to 55 preferably is the first catalyst of the system and preferably no catalyst is present between the engine and the catalyst for the selective catalytic reduction of nitrogen oxide according to any one of embodiments 34 to 55.

67. The system of embodiment 66, wherein the system further comprises a selective catalytic reduction catalyst which is positioned downstream of the catalyst for the selective catalytic reduction of nitrogen oxide according to any one of embodiments 34 to 55 and upstream of the catalyzed soot filter;
wherein the system preferably further comprises an ammonia oxidation catalyst, said ammonia oxidation catalyst being positioned downstream of the selective catalytic reduction catalyst and upstream of the catalyzed soot filter.

68. The system of embodiment 66 or 67 further comprising a first reductant injector, the first reductant injector being positioned upstream of the catalyst for the selective catalytic reduction of nitrogen oxide according to any one of embodiments 34 to 55, wherein the reductant preferably is urea.

69. The system of any one of embodiments 66 to 68, wherein the system further comprises a SCR/AMOx catalyst positioned downstream of the catalyzed soot filter, wherein the system preferably further comprises a reductant injector positioned upstream of the SCR/AMOx catalyst and downstream of the catalyzed soot filter, the reductant more preferably being urea.

The present invention is further illustrated by the following second set of embodiments and combinations of embodiments resulting from the dependencies and back-references as indicated.

1'. An exhaust gas treatment catalyst comprising
(a) a substrate comprising an inlet end, an outlet end, a substrate axial length extending from the inlet end to the outlet end and a plurality of passages defined by internal walls of the substrate extending therethrough;
(b) a first coating disposed on the surface of the internal walls of the substrate (a) over z % of the substrate axial length, from the outlet end to the inlet end of the substrate (a), wherein z is in the range of from 5 to 100, the coating comprising an ammonia oxidation catalyst;
(c) a second coating disposed on the first coating, or on the first coating and the surface of the internal walls of the substrate, over x % of the substrate axial length, from the inlet end to the outlet end of the substrate (a), wherein x is in the range of from 80 to 100, the coating comprising a zeolitic material comprising copper;
wherein the catalyst exhibits one or more zones:
(b.1) a first zone extending over y % of the substrate axial length, from the inlet end to the outlet end of the substrate (a), wherein y is in the range of from 10 to x; wherein the first zone comprises the second coating comprising the zeolitic material comprising copper, wherein, in said zone, the second coating further comprises iron;
(b.2) if x>y, a second zone extending from y % to x % of the substrate axial length from the inlet end to the outlet end of the substrate (a), wherein the second zone comprises the second coating comprising a zeolitic material comprising copper.

2'. The catalyst of embodiment 1', wherein z is in the range of from 7 to 70, preferably in the range of from 8 to 50, more preferably in the range of from 9 to 40, more preferably in the range of from 10 to 35, wherein the first zone preferably is free of the first coating.

3'. The catalyst of embodiment 1' or 2', wherein the ammonia oxidation catalyst comprises a platinum group metal component, wherein the platinum group metal component is one or more of platinum, palladium, rhodium, osmium and iridium, preferably one or more of platinum, palladium and rhodium, more preferably one or more of platinum and palladium, more preferably platinum.

4'. The catalyst of embodiment 3', wherein the ammonia oxidation catalyst further comprises a non-zeolitic oxidic material supporting the platinum group metal component, wherein the non-zeolitic oxidic material preferably comprises one or more of alumina, silica, titania, and zirconia, more preferably one or more of alumina, silica and titania, more preferably one or more of alumina and silica, wherein the non-zeolitic oxidic material more preferably comprises alumina,
  wherein from 98 to 100 weight-%, preferably from 99 to 100 weight-%, more preferably from 99.5 to 100 weight-%, more preferably from 99.9 to 100 weight-%, of the ammonia oxidation catalyst consist of the platinum group metal component and the non-zeolitic oxidic material.

5'. The catalyst of any one of embodiments 1' to 4', wherein the catalyst comprises the first coating at a loading in the range of from 0.25 to 10 g/in$^3$, preferably in the range of from 0.5 to 8 g/in$^3$, more preferably in the range of from 1 to 5 g/in$^3$.

6'. The catalyst of any one of embodiments 1' to 5', wherein from 98 to 100 weight-%, preferably from 99 to 100 weight-%, more preferably from 99.5 to 100 weight-%, more preferably from 99.9 to 100 weight-%, of the first coating consist of the ammonia oxidation catalyst.

7'. The catalyst of any one of embodiments 1' to 6', wherein the zeolitic material comprising copper contained in the second coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, wherein the zeolitic material comprising copper contained in the second coating more preferably has a framework type CHA; or
  preferably selected from the group consisting of FER, BEA, MFI, FAU, MOR, a mixture of two or more thereof and a mixed type of two or more thereof, more preferably selected from the group consisting of FER, BEA, MFI, FAU, a mixture of two or more thereof and a mixed type of two or more thereof, wherein the zeolitic material comprising copper contained in the second coating more preferably has a framework type FER or BEA.

8'. The catalyst of any one of embodiments 1' to 7', wherein from 95 to 100 weight-%, preferably from 98 to 100 weight-%, more preferably from 99 to 100 weight-%, of the framework structure of the zeolitic material comprised in the second coating consist of Si, Al, and O, wherein in the framework structure, the molar ratio of Si to Al, calculated as molar $SiO_2:Al_2O_3$, preferably is in the range of from 2:1 to 50:1, more preferably in the range of from 5:1 to 45:1, more preferably in the range of from 7:1 to 35:1, more preferably in the range of from 10:1 to 30:1, more preferably in the range of from 15:1 to 22:1 or more preferably in the range of from 24:1 to 30:1.

9'. The catalyst of any one of embodiments 1' to 8', wherein the zeolitic material contained in the second coating, preferably which has a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.

10'. The catalyst of any one of embodiments 1' to 9', wherein the amount of copper, calculated as CuO, comprised in the zeolitic material contained in the second coating is in the range of from 1.5 to 15 weight-%, preferably in the range of from 2 to 10 weight-%, based on the weight of the zeolitic material comprised in the second coating;
  wherein the amount of copper, calculated as CuO, comprised in the zeolitic material contained in the second coating is more preferably in the range of from 3 to 8 weight-%, more preferably in the range of from 4.5 to 7 weight-%, more preferably in the range of from 4.6 to 6 weight-%, more preferably in the range of from 4.8 to 5.5 weight-%, based on the weight of the zeolitic material comprised in the second coating; or
  more preferably in the range of from 3.2 to 4 weight-%, based on the weight of the zeolitic material comprised in the second coating.

11'. The catalyst of any one of embodiments 1' to 10', wherein the second coating further comprises an oxidic component, wherein the oxidic component preferably is one or more of alumina, silica, zirconia, and titania, more preferably one or more of zirconia and alumina, more preferably zirconia.

12'. The catalyst of embodiment 11', wherein the amount of the oxidic component, calculated as the oxide, preferably the amount of zirconia, calculated as $ZrO_2$, is in the range of from 1 to 10 weight-%, preferably in the range of from 2 to 8 weight-%, more preferably in the range of from 3 to 7 weight-%, based on the weight of the zeolitic material comprised in the second coating.

13'. The catalyst of any one of embodiments 1' to 12', wherein x is in the range of from 90 to 100, preferably in the range of from 95 to 100, more preferably in the range of from 98 to 100, more preferably in the range of from 99 to 100.

14'. The catalyst of any one of embodiments 1' to 13', wherein the loading of the second coating is in the range of from 1 to 6 g/in$^3$, preferably in the range of from 1.5 to 4 g/in$^3$, more preferably in the range of from 1.75 to 3 g/in$^3$.

15'. The catalyst of any one of embodiments 1' to 14', wherein y is in the range of from 20 to x, preferably in the range of from 20 to 60, more preferably in the range of from 40 to 60, or preferably in the range of from 80 to x, more preferably in the range of from 90 to x, more preferably x=y.

16'. The catalyst of any one of embodiments 1' to 15', wherein the second coating is disposed on the first coating and on the surface of the internal walls of the substrate.

17'. The catalyst of any one of embodiments 1' to 16', wherein the second coating comprised in the first zone comprises iron in an amount in the range of from 0.5 to 3.5 weight-%, preferably in the range of from 1 to 3 weight-%, more preferably in the range of from 1.5 to 2.75 weight-%, or preferably in the range of from 3.1 to 3.3 weight-%, based on the weight of the zeolitic material, which preferably has a framework type CHA.

18'. The catalyst of any one of embodiments 1' to 17', wherein from 98 to 100 weight-%, preferably from 99 to 100 weight-%, more preferably from 99.5 to 100 weight-%, more preferably from 99.9 to 100 weight-%, of the second coating comprised in the first zone consist of iron, a zeolitic material comprising copper and preferably an oxidic component as defined in embodiment 11' or 12'.

19'. The catalyst of any one of embodiments 1' to 18', wherein the catalyst exhibits two zones, wherein the first zone preferably is free of the first coating.

20'. The catalyst of any one of embodiments 1' to 19', wherein x>y.

21'. The catalyst of embodiment 20', wherein from 0 to 0.001 weight-%, preferably from 0 to 0.0001 weight-%, more preferably from 0 to 0.00001 weight-%, of the second coating comprised in the second zone consist of iron, calculated as Fe$_2$O$_3$.

22'. The catalyst of embodiment 20' or 21', wherein from 98 to 100 weight-%, preferably from 99 to 100 weight-%, more preferably from 99.5 to 100 weight-%, more preferably from 99.9 to 100 weight-%, of the second coating comprised in the second zone consist of a zeolitic material comprising copper and preferably an oxidic component as defined in embodiment 11' or 12'.

23'. The catalyst of any one of embodiments 1' to 22', wherein from 0 to 0.001 weight-%, preferably from 0 to 0.0001 weight-%, more preferably from 0 to 0.00001 weight-%, of the second coating consist of vanadium.

24'. The catalyst of any one of embodiments 1' to 23', wherein from 0 to 0.001 weight-%, preferably from 0 to 0.0001 weight-%, more preferably from 0 to 0.00001 weight-%, of the second coating consist of any platinum group metals.

25'. The catalyst of any one of embodiments 1' to 23', wherein the substrate (a) is a flowthrough substrate or a wall-flow filter substrate, preferably a flow-through substrate.

26'. The catalyst of any one of embodiments 1' to 25', wherein the substrate (a) comprises, preferably consists of, a ceramic substance, wherein the ceramic substance preferably comprises, more preferably consists of, one or more of an alumina, a silica, a silicate, an aluminosilicate, a cordierite, a mullite, an aluminotitanate, a silicon carbide, a zirconia, a magnesia, more preferably a spinel, and a titania, more preferably one or more of a silicon carbide and a cordierite; wherein the ceramic substance more preferably comprises, more preferably consists of, a cordierite.

27'. The catalyst of any one of embodiments 1' to 26', consisting of the substrate (a), the first coating (b) and the second coating (c).

28'. Use of a catalyst according to any one of embodiments 1' to 27' for the selective catalytic reduction of NOx and the oxidation of ammonia, preferably exiting from a diesel engine.

29'. A method for the selective catalytic reduction of nitrogen oxides and the oxidation of ammonia, wherein the nitrogen oxides are comprised in an exhaust gas stream, said method comprising
   (1) providing the exhaust gas stream, preferably from a diesel engine;
   (2) passing the exhaust gas stream provided in (1) through an exhaust gas treatment catalyst according to any one of embodiments 1' to 27'.

30'. A process for preparing an exhaust gas treatment catalyst according to any one of embodiments 1' to 27', the process comprising
   (a) preparing a first aqueous mixture comprising water and an ammonia oxidation catalyst precursor;
   (b) disposing the first aqueous mixture obtained according to (i) on the surface of the internal walls of a substrate comprising an inlet end, an outlet end, a substrate axial length extending from the inlet end to the outlet end and a plurality of passages defined by internal walls of the substrate extending therethrough, over z % of the substrate axial length from the outlet end to the inlet end of the substrate, wherein z is in the range of from 5 to 100; calcining the substrate having the first aqueous mixture disposed thereon, obtaining a substrate comprising a first coating;
   (c) preparing a second aqueous mixture comprising water and a zeolitic material comprising copper;
   (d) disposing the second aqueous mixture obtained according to (c) on the substrate obtained according to (b), over x % of the substrate axial length from the inlet end to the outlet end of the substrate, wherein x is in the range of from 80 to 100; calcining the substrate having the second aqueous mixture disposed thereon, obtaining a substrate comprising a first coating and a second coating comprising a zeolitic material comprising copper;
   (e) preparing a third aqueous mixture comprising water and an iron salt;
   (f) disposing the third aqueous mixture obtained according to (e) on the substrate obtained according to (d) over y % of the substrate axial length from the inlet end to the outlet end of the substrate, wherein y is in the range of from 10 to x, obtaining a substrate comprising, in a first zone, the second coating comprising over y % of the substrate axial length an iron salt and a zeolitic material comprising copper; and, if x>y, in a second zone extending from y % to x % of the substrate axial length from the inlet end to the outlet end, the second coating comprising a zeolitic material comprising copper;

(g) calcining the substrate obtained according to (f).

31'. The process of embodiment 30', wherein the ammonia oxidation catalyst precursor comprises a source of a platinum group metal component, preferably a source of platinum or palladium, more preferably a source of platinum, more preferably a platinum salt.

32'. The process of embodiment 31', wherein the ammonia oxidation catalyst precursor further comprises a non-zeolitic oxidic material, wherein the non-zeolitic oxidic material preferably comprises one or more of alumina, silica, titania, and zirconia, more preferably one or more of alumina, silica and titania, more preferably one or more of alumina and silica, wherein the non-zeolitic oxidic material more preferably comprises alumina.

33'. The process of embodiment 31' or 32', wherein (a) comprises (a.1) impregnating the source of a platinum group metal component on the non-zeolitic oxidic material;

(a.2) calcining the impregnated non-zeoltic oxidic material obtained according to (a.1);

(a.3) admixing water with the calcined impregnated non-zeoltic oxidic material obtained according to (a.2).

34'. The process of any one of embodiments 30' to 33', wherein the substrate provided in (b) is a flow-through substrate or a wall-flow filter substrate, preferably a flow-through substrate.

35'. The process of any one of embodiments 30' to 34', wherein the substrate provided in (b) comprises, preferably consists of, a ceramic substance, wherein the ceramic substance preferably comprises, more preferably consists of, one or more of an alumina, a silica, a silicate, an aluminosilicate, a cordierite, a mullite, an aluminotitanate, a silicon carbide, a zirconia, a magnesia, more preferably a spinel, and a titania, more preferably one or more of a silicon carbide and a cordierite, more preferably a cordierite.

36'. The process of any one of embodiments 30' to 35', wherein z is in the range of from 7 to 70, preferably in the range of from 8 to 50, more preferably in the range of from 9 to 40, more preferably in the range of from 10 to 35.

37'. The process of any one of embodiments 30' to 36', wherein prior to calcining according to (b), the substrate having the first aqueous mixture disposed thereon is dried in a gas atmosphere having a temperature in the range of from 90 to 250° C., preferably in the range of from 100 to 150° C., the gas atmosphere more preferably being air;

wherein drying preferably is performed for a duration in the range of from 10 to 360 minutes, more preferably in the range of from 20 to 240 minutes.

38'. The process of any one of embodiments 30' to 37', wherein calcining the substrate having the first aqueous mixture disposed thereon according to (b) is performed in a gas atmosphere having a temperature in the range of from 400 to 900° C., the gas atmosphere more preferably being air, wherein calcining the substrate having the first aqueous mixture disposed thereon according to (b) preferably is performed in a gas atmosphere for a duration in the range of from 5 to 360 minutes, the gas atmosphere more preferably comprising, more preferably consisting of, air.

39'. The process of any one of embodiments 32' to 38', wherein from 98 to 100 weight-%, preferably from 99 to 100 weight-%, more preferably from 99.5 to 100 weight-%, more preferably from 99.9 to 100 weight-%, of the first aqueous mixture prepared according to (a) consist of water, the source of a platinum group metal component and the non-zeolitic oxidic material.

40'. The process of any one of embodiments 30' to 39', wherein the zeolitic material comprising copper contained in the second aqueous mixture prepared according to (c) has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEl, MEL, MEP, MER, MEI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, wherein the zeolitic material comprising copper contained in the second aqueous mixture prepared according to (c) more preferably has a framework type CHA; or preferably selected from the group consisting of FER, BEA, MEl, FAU, MOR, a mixture of two or more thereof and a mixed type of two or more thereof, more preferably selected from the group consisting of FER, BEA, MEl, FAU, a mixture of two or more thereof and a mixed type of two or more thereof, wherein the zeolitic material comprising copper contained in the second aqueous mixture prepared according to (c) more preferably has a framework type FER or BEA.

41'. The process of embodiment 40', wherein from 95 to 100 weight-%, preferably from 98 to 100 weight-%, more preferably from 99 to 100 weight-%, of the framework structure of the zeolitic material consist of Si, Al, 0, and optionally H, wherein in the framework structure, the molar ratio of Si to Al, calculated as molar $SiO_2:Al_2O_3$, preferably is in the range of from 2:1 to 50:1, more preferably in the range of from 5:1 to 45:1, more preferably in the range of from 7:1 to 35:1, more preferably in the range of from 10:1 to 30:1, more preferably in the range of from 15:1 to 22:1 or more preferably in the range of from 24:1 to 30:1.

42'. The process of any one of embodiments 30' to 41', wherein the zeolitic material contained in the second aqueous mixture prepared according to (c), preferably which has a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.

43'. The process of any one of embodiments 30' to 42', wherein the zeolitic material comprised in the second aqueous mixture prepared according to (c), preferably which has a framework type CHA, has a BET specific surface area in the range of from 300 to 800 $m^2/g$, preferably in the range of from 400 to 700 $m^2/g$, more preferably in the range of from 500 to 630 $m^2/g$, the BET specific surface area being determined as described in Reference Example 1.

44'. The process of any one of embodiments 30' to 43', wherein the amount of copper, calculated as CuO, comprised in the zeolitic material contained in the second aqueous mixture prepared according to (c) is in the range of from 1.5 to 15 weight-%, preferably in the range of from 2 to 10 weight-%, based on the weight of the zeolitic material comprised in the second aqueous mixture prepared according to (c);

wherein the amount of copper, calculated as CuO, comprised in the zeolitic material contained in the second aqueous mixture prepared according to (c) is more preferably in the range of from 3 to 8 weight-%, more preferably in the range of from 4.5 to 7 weight-%, more preferably in the range of from 4.6 to 6 weight-%, more preferably in the range of from 4.8 to 5.5 weight-%, based on the weight of the zeolitic material comprised in the second aqueous mixture prepared according to (c); or more preferably in the range of from 3.2 to 4 weight-%, based on the weight of the zeolitic material comprised in the second aqueous mixture prepared according to (c).

45'. The process of any one of embodiments 30' to 44', wherein the second aqueous mixture prepared according to (c) further comprises a precursor of an oxidic component, wherein the precursor preferably is one or more of an aluminum salt, a silicon salt, a zirconium salt, and a titanium salt, more preferably one or more of a zirconium salt, and an aluminum salt, more preferably a zirconium salt, more preferably zirconium acetate.

46'. The process of embodiment 45', wherein in the second aqueous mixture prepared according to (c), the amount of the precursor of the oxidic component, calculated as the oxide, preferably as alumina, silica, zirconia or titania, preferably the amount of the zirconium salt, calculated as $ZrO_2$, is in the range of from 1 to 10 weight-%, preferably in the range of from 2 to 8 weight-%, more preferably in the range of from 3 to 7 weight-%, based on the weight of the zeolitic material comprised in the second aqueous mixture prepared according to (c).

47'. The process of any one of embodiments 30' to 46', wherein the water comprised in the second aqueous mixture prepared according to (c) is deionized water.

48'. The process of any one of embodiments 30' to 47', wherein the second aqueous mixture prepared according to (c) comprises at most 1000 ppm, preferably from 0 to 100 ppm, more preferably from 0 to 10 ppm of iron, calculated as elemental iron.

49'. The process of any one of embodiments 30' to 48', wherein from 98 to 100 weight-%, preferably from 99 to 100 weight-%, more preferably from 99.5 to 100 weight-%, more preferably from 99.9 to 100 weight-%, of the second aqueous mixture prepared according to (c) consist of water, the zeolitic material comprising copper, and preferably a precursor of an oxide as defined in embodiment 45' or 46'.

50'. The process of any one of embodiments 30' to 49', wherein after preparing a second aqueous mixture according to (c) and prior to disposing said mixture on the substrate obtained according to (b), the second aqueous mixture is milled or mixed, preferably until the particles of the second aqueous mixture have a Dv90 in the range of from 3 to 20 micrometers, more preferably in the range of from 5 to 15 micrometers, more preferably in the range of from 6 to 8 micrometers or more preferably in the range of from 9 to 12 micrometers, the Dv90 being determined as described in Reference Example 2.

51'. The process of any one of embodiments 30' to 50', wherein x is in the range of from 90 to 100, preferably in the range of from 95 to 100, more preferably in the range of from 98 to 100, more preferably in the range of from 99 to 100.

52'. The process of any one of embodiments 30' to 51', wherein prior to calcining according to (d), the substrate having the second aqueous mixture disposed thereon is dried in a gas atmosphere having a temperature in the range of from 90 to 250° C., preferably in the range of from 100 to 150° C., the gas atmosphere more preferably being air;

wherein drying preferably is performed for a duration in the range of from 10 to 360 minutes, more preferably in the range of from 20 to 240 minutes, more preferably in the range of from 30 to 90 minutes.

53'. The process of any one of embodiments 30' to 52', wherein calcining the substrate having the second aqueous mixture disposed thereon according to (d) is performed in a gas atmosphere having a temperature in the range of from 400 to 800° C., preferably in the range of from 500 to 700° C., more preferably in the range of from 550 to 650° C., the gas atmosphere more preferably being air.

54'. The process of any one of embodiments 30' to 53', wherein calcining the substrate having the second aqueous mixture disposed thereon according to (d) is performed in a gas atmosphere for a duration in the range of from 5 to 360 minutes, preferably in the range of from 20 to 240 minutes, more preferably in the range of from 30 to 90 minutes, the gas atmosphere more preferably comprising, more preferably consisting of, air.

55'. The process of any one of embodiments 30' to 54', wherein the substrate comprising the second coating comprising a zeolitic material comprising copper obtained according to (d) has a water adsorption, expressed in weight of $H_2O$ relative to the volume of the second coating, in the range of from 1 to 5 g/in³, preferably in the range of from 1.5 to 4 g/in³, more preferably in the range of from 2 to 3.5 g/in³, the water adsorption being determined as defined in Reference Example 5.

56'. The process of any one of embodiments 30' to 55', wherein the iron salt comprised in the third aqueous mixture prepared according to (e) is one or more of iron (III) nitrate, iron (II) acetate, ammonium iron (III) citrate, iron (II) sulfate, and iron (II) oxalate, preferably iron (III) nitrate, more preferably iron (III) nitrate nonahydrate.

57'. The process of any one of embodiments 30' to 55', wherein the third aqueous mixture prepared according to (e) comprises the iron salt in an amount, calculated as $Fe_2O_3$, which is in the range of from 4 to 40 weight-%, preferably in the range of from 7 to 30 weight-%, more preferably in the range of from 10 to 25 weight-%, more preferably in the range of from 13 to 22 weight-%, more preferably in the range of from 15 to 20 weight-%, based on the weight of the third aqueous mixture prepared according to (e).

58'. The process of any one of embodiments 30' to 57', wherein the water comprised in the third aqueous mixture prepared according to (e) is deionized water.

59'. The process of any one of embodiments 30' to 58', wherein from 98 to 100 weight-%, preferably from 99 to 100 weight-%, more preferably from 99.5 to 100 weight-%, more preferably from 99.9 to 100 weight-%, of the third aqueous mixture prepared according to (e) consist of water and the iron salt.

60'. The process of any one of embodiments 30' to 59', wherein according to (f) disposing the third aqueous mixture obtained according to (e) on the substrate obtained according to (d) comprises dipping the substrate comprising the second coating comprising a zeolitic material comprising copper obtained according to (d) into the third aqueous mixture prepared according to (e), preferably for a duration in the range of from 5 to 120 seconds, more preferably in the range of from 7 to 80 seconds, more preferably in the range of from 9 to 60 seconds, more preferably in the range of from 10 to 50 seconds.

61'. The process of any one of embodiments 30' to 60', wherein y is in the range of from 20 to x, preferably in the range of from 20 to 60, more preferably in the range of from 40 to 60, or preferably in the range of from 80 to x, more preferably in the range of from 90 to x, more preferably x=y.

62'. The process of any one of embodiments 30' to 61', wherein prior to calcining according to (g), the substrate obtained in (f) is dried in a gas atmosphere having a temperature in the range of from 80 to 250° C., preferably in the range of from 90 to 200° C., more preferably in the range of from 100 to 150° C., more preferably in the range of from 110 to 130° C.

63'. The process of embodiment 62', wherein drying is performed in a gas atmosphere for a duration in the range of from 10 to 180 minutes, preferably in the range of from 20 to 120 minutes, more preferably in the range of from 30 to 90 minutes, more preferably in the range of from 40 to 80 minutes.

64'. The process of embodiment 62' or 63', wherein the gas atmosphere comprises, preferably consists of, air.

65'. The process of any one of embodiments 30' to 64', wherein calcining according to (g) is performed in a gas atmosphere having a temperature in the range of from 400 to 800° C., preferably in the range of from 450 to 700° C., more preferably in the range of from 500 to 650° C., more preferably in the range of from 550 to 650° C.

66'. The process of any one of embodiments 30' to 65', wherein calcining according to (g) is performed for a duration in the range of from 10 to 180 minutes, preferably in the range of from 20 to 120 minutes, more preferably in the range of from 30 to 90 minutes, more preferably in the range of from 40 to 80 minutes.

67'. The process of embodiment 65' or 66', wherein the gas atmosphere comprises, preferably consists of, air.

68'. The process of any one of embodiments 30' to 67', consisting of (a), (b), (c), (d), (e), (f) and (g).

Further, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Furthermore, in the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

Further, in the context of the present invention, the term "consists of" with regard to the weight % of one or more components indicates the weight-% amount of said component(s) based on 100 weight-% of the entity in question. For example, the wording "wherein from 0 to 0.001 weight-% of the second zone consists of iron" indicates that among the 100 weight-% of the components of which said coating consists of, 0 to 0.001 weight-% is iron.

Further, in the context of the present invention, the term "platinum group metals" refers to the metals of the group consisting of platinum, palladium, rhodium, iridium, osmium and ruthenium.

The present invention is further illustrated by the following Reference Examples, Comparative Examples, and Examples.

EXAMPLES

Reference Example 1 Measurement of the BET Specific Surface Area

The BET specific surface area was determined according to DIN 66131 or DIN-ISO 9277 using liquid nitrogen.

Reference Example 2 Determination of the Volume-Based Particle Size Distributions The particle size distributions were determined by a static light scattering method using Sympatec HELOS (3200) &

51

52

QUIXEL equipment, wherein the optical concentration of the sample was in the range of from 6 to 10%.

Reference Example 3 Cu-Chabazite Prepared According to Usual Liquid Phase Ion-Exchange (LPIE) Process The zeolitic materials having the framework structure type CHA comprising Cu and used in some of the examples herein were prepared essentially as disclosed in U.S. Pat. No. 8,293,199 B2. Particular reference is made to Inventive Example 2 of U.S. Pat. No. 8,293,199 B2, column 15, lines 26 to 52.

Reference Example 4 General Coating Method

In order to coat a flow-through substrate with a coating, the flow-through substrate was immersed vertically in a portion of a given slurry for a specific length of the substrate which was equal to the targeted length of the coating to be applied. In this manner, the washcoat contacted the walls of the substrate. The sample was left in the slurry for a specific period of time, usually for 1-10 seconds. The substrate was then removed from the slurry, and excess slurry was removed from the substrate by allowing it to drain from the substrate, then by blowing with compressed air (against the direction of slurry penetration).

Reference Example 5 Determination of the Water Adsorption of a Cu-CHA Catalyst 1) A catalyst, which has been previously dried and calcined, comprising a core sample (for example with 1 inch×3 inches core) coated with a catalytic coating (Cu-CHA)—in the present case, the catalyst of Comparative Example 1—is weighted under ambient conditions (room temperature with no additional pre-drying or pre-calcining before weighting). The weight A is noted.
2) Then, the catalyst is immerged completely in water for 30 seconds and slightly moved back and forth to release gas bubbles.
3) The catalyst is removed from water and drained.
4) The catalyst is again weighted under the same ambient conditions used for 1). The weight B is noted. The water adsorption of the catalyst is obtained by calculating the difference between the weight B and the weight A.

Comparative Example 1 Preparation of a Selective Catalytic Reduction Catalyst (Cu-SCR)

An aqueous solution of zirconyl acetate was mixed with 1692 g of Cu-CHA zeolite with a Cu content, calculated as CuO, of 5.1 weight-% based on the weight of Cu-CHA (a $SiO_2$:$Al_2O_3$ molar ratio of about 18:1, a BET specific surface area of 5 $m^2$/g), prepared as described in Reference Example 3, and deionized water to form a slurry. The obtained slurry was then dispersed by high shear mixing until the resulting $D_y90$ determined as described in Reference Example 2 herewith was 10 micrometers. The slurry was then disposed over the full length of an uncoated flow-through honeycomb cordierite monolith substrate (diameter 2.54 cm (1 inch) x length: 76.2 cm (3 inches) cylindrically shaped substrate with 400/(2.54)$^2$ cells per square centimeter and 0.1016 millimeter (4 mil) wall thickness). Said substrate was coated according to the method described in Reference Example 4.

Afterwards, the substrate was dried at 120° C. for 60 minutes and then calcined at 590° C. for 60 minutes. The washcoat loading after calcination was of about 128.15 g/l (2.1 g/in$^3$), including about 121.44 g/l (1.99 g/in$^3$) of Cu-CHA and about 6.71 g/l (0.11 g/in$^3$) of zirconia.

Example 1 Preparation of a Selective Catalytic Reduction Catalyst (Fe/Cu-SCR)

Iron Impregnation

The water adsorption of the Cu-SCR catalyst prepared according to Comparative Example 1 was determined as described in Reference Example 5 and said water adsorption was of 176.97 g/l (2.9 g/in$^3$) by weight/volume. The iron impregnation was performed under the same ambient conditions defined in 1) of Reference Example 5. An aqueous solution of 100 g deionized water and 17.85 g iron nitrate nonahydrate (Fe(III)NO$_3$ 9H$_2$O) was prepared. The Cu-SCR catalyst prepared according to Comparative Example 1 was then dipped into the aqueous iron nitrate solution at a desired zone length (ranging from 33% to 100%—see Table 1 below) for 30 seconds before being removed from the solution. Each catalyst was subsequently dried in air for 1 h at 120° C. to remove the excess water and subsequently calcined for 1 h at 590° C.

TABLE 1

| | Cu content (wt.-%*) | Zeolitic material | Fe content (wt.-%**) | Fe zone length (%) | Total washcoat loading (g/in$^3$) |
|---|---|---|---|---|---|
| Example 1.1 | 5.1 | CHA (SAR: 18:1) | 1.35 | 33 | 2.13 |
| Example 1.2 | 5.1 | CHA (SAR: 18:1) | 2.47 | 50 | 2.15 |
| Example 1.3 | 5.1 | CHA (SAR: 18:1) | 3.14 | 100 | 2.16 |

*Cu content, calculated as CuO, in weight-% based on the weight of the zeolitic material.
**Fe content, calculated as Fe$_2$O$_3$, in weight-% based on the weight of the zeolitic material.

Example 2 Testing of the Catalysts of Example 1 and of Comparative Example 1 NOx Conversion and N$_2$O Formation The catalysts of Examples 1.1, 1.2, 1.3 and of Comparative Example 1 were further aged under hydrothermal conditions (10% O$_2$/10% H$_2$O) at 650° C. for 50 hours prior to measurement.

SCR Testing Conditions:
   Space velocity (SV)=60 k h$^{-1}$, Temperatures: 250° C., 200° C.
   Standard SCR Gas feed: 550 ppm NH$_3$, 500 ppm NO, 10% H$_2$O, 10% O$_2$
   Fast SCR Gas feed: 550 ppm NH$_3$, 250 ppm NO, 250 ppm NO$_2$, 10% H$_2$O, 10% O$_2$ The results were displayed in FIGS. 1a/1b and 2a/2b. FIGS. 1a and 2a summarize the results obtained under the standard SCR gas feed conditions, while FIGS. 1b and 2b summarize the results obtained under the fast SCR gas feed conditions, both described above. As may be taken from FIG. 1a, the NOx conversion level of the comparative example 1 was of 74% at 200° C. and of 99% at 250° C. While the NOx conversion at 250° C. is already very high for all samples, the performance of Examples 1.1 to 1.3 is on the same level as measured with the comparative example 1. Therefore, to distinguish the samples in NOx conversion, we must take a look at the 200° C. test point. Example 1.1 and 1.2 are equal to close to the comparative example in NOx conversion at 200° C. under the standard SCR feed gas conditions (FIG. 1*a*), only the Example 1.3 with the 100% Fe-zone length is significantly lower in NOx conversion. However, the advantage of the examples will be seen in the $N_2O$ make in FIG. 2*a*. The $N_2O$ make at 200° C. of the comparative example can be decreased from 11 to 3 ppm, and considering approximately identical NOx conversion from 11 to 7 ppm (Example 1.2 vs. Comparative Example 1). The advantage of the lower $N_2O$ make of the Examples 1.1 to 1.3 can be seen at the 250° C. test point as well.

As may be taken from FIGS. 1*b* and 2*b*, generally due to the fast SCR reaction occurring, the NOx conversion level is higher compared with to the results obtained using the standard SCR feed gas conditions. However, only the 100% Fe-zone length sample was measured with 87% NOx conversion at 200° C. compared to 91 to 93% NOx conversion of the comparative example and Examples 1.1 and 1.2. Even under the fast SCR feed gas conditions, the advantage of Example 1.1 to 1.3 can be seen in the significantly lower $N_2O$ make compared to comparative example 1. At 200° C. the $N_2O$ make was decreased by 6 to 7 ppm coming from 20 ppm. At 250° C., the decrease was with 3 to 4 ppm detectable, but less pronounced.

In summary, the new catalyst manufacturing concept has shown that flexible Fe containing zones are possible and that the advantage of adding Fe to the comparative example 1 will lead to a significant decrease in $N_2O$ make, while maintaining the NOx conversion level under both standard SCR and fast SCR gas feed conditions.

Reference Example 6 Preparation of Cu-FER and Cu-BEA

The Cu-zeolitic materials having a framework type FER and BEA, respectively, were prepared with a target Cu content of 3.42 weight-% based on the weight of the zeolitic material as described in the following. An aqueous mixture of $Cu(NO_3)_2$ was prepared by mixing water with $Cu(NO_3)_2$ for 20 minutes at 20° C. The zeolitic material was impregnated with said aqueous $Cu(NO_3)_2$ mixture for 35 minutes under stirring at ambient conditions. The Cu-impregnated zeolitic material was collected by filtration and was dried over night at 120° C. The dried material was then calcined at 700° C. in air for 2 hours, obtaining a powder of Cu-containing zeolitic material.

Comparative Example 2 Preparation of a Selective Catalytic Reduction Catalyst (Cu-SCR)

An aqueous solution of zirconyl acetate ($ZrO_2$: 5 weight-% of based on the zeolite) was mixed with Cu-FER zeolite with a Cu content, calculated as CuO, of 3.42 weight-% based on the weight of Cu-FER (a $SiO_2$:$Al_2O_3$ molar ratio of about 20:1, a BET specific surface area of 400 $m^2/g$), prepared as described in Reference Example 6, and deionized water to form a slurry. The obtained slurry was then dispersed by high shear mixing until the resulting $D_v90$ determined as described in Reference Example 2 herewith was 7.5 micrometers. The pH of the slurry was adjusted to about 5 (target pH) and said slurry had a solid content of about 35 weight-%. The slurry was then disposed over the full length of an uncoated flow-through honeycomb cordierite monolith substrate (diameter 2.54 cm (1 inch) x length: 76.2 cm (3 inches) cylindrically shaped substrate with $400/(2.54)^2$ cells per square centimeter and 0.1016 millimeter (4 mil) wall thickness). Said substrate was coated according to the method described in Reference Example 4. Afterwards, the substrate was dried at 120° C. for 60 minutes and then calcined at 590° C. for 60 minutes. The washcoat loading after calcination was of about 2.1 $g/in^3$, including 1.99 $g/in^3$ of Cu-FER and 0.1 $g/in^3$ of zirconia.

Example 2 Preparation of a Selective Catalytic Reduction Catalyst (Fe/Cu-SCR)

Iron Impregnation

The water adsorption of the Cu-SCR catalyst prepared according to Comparative Example 2 was determined as described in Reference Example 5 and said water adsorption was of 2.6 $g/in^3$ by weight/volume. The iron impregnation was performed under the same ambient conditions defined in 1) of Reference Example 5. An aqueous solution of 100 g deionized water and 17.85 g iron nitrate nonahydrate (Fe (III)$NO_3$ $9H_2O$) was prepared. The Cu-SCR catalyst prepared according to Comparative Example 2 was then dipped into the aqueous iron nitrate solution at a desired zone length (33% and 100%—see Table 2 below) for 30 seconds before being removed from the solution. Each catalyst was subsequently dried in air for 1 h at 120° C. to remove the excess water and subsequently calcined for 1 h at 590° C.

TABLE 2

| | Cu content (wt.-%*) | Zeolitic material | Fe content (wt.-%**) | Fe zone length (%) | Total wash-coat loading (g/in³) |
|---|---|---|---|---|---|
| Example 2.1 | 3.42 | FER (SAR: 20:1) | 1.3 | 33 | 2.12 |
| Example 2.2 | 3.42 | FER (SAR: 20:1) | 1.9 | 100 | 2.13 |

*Cu content, calculated as CuO, in weight-% based on the weight of the zeolitic material.
**Fe content, calculated as $Fe_2O_3$, in weight-% based on the weight of the zeolitic material.

Comparative Example 3 Preparation of a Selective Catalytic Reduction Catalyst (Cu-SCR)

An aqueous solution of zirconyl acetate ($ZrO_2$: 5 weight-% of based on the zeolite) was mixed with Cu-BEA zeolite with a Cu content, calculated as CuO, of 3.42 weight-% based on the weight of Cu-BEA (a $SiO_2$:$Al_2O_3$ molar ratio of about 26:1, a BET specific surface area of 700 $m^2/g$), prepared as described in Reference Example 6, and deionized water to form a slurry. The obtained slurry was then dispersed by high shear mixing until the resulting $D_v90$ determined as described in Reference Example 2 herewith was 7.5 micrometers. The pH of the slurry was adjusted to about 5 (target pH) and said slurry had a solid content of about 35 weight-%. The slurry was then disposed over the full length of an uncoated flow-through honeycomb cordierite monolith substrate (diameter 2.54 cm (1 inch) x length: 76.2 cm (3 inches) cylindrically shaped substrate with $400/(2.54)^2$ cells per square centimeter and 0.1016 millimeter (4 mil) wall thickness). Said substrate was coated according to the method described in Reference Example 4. Afterwards, the substrate was dried at 120° C. for 60 minutes and then calcined at 590° C. for 60 minutes. The washcoat loading after calcination was of 2.1 $g/in^3$, including 1.99 $g/in^3$ of Cu-BEA and 0.1 $g/in^3$ of zirconia.

Example 3 Preparation of a Selective Catalytic Reduction Catalyst (Fe/Cu-SCR)

Iron Impregnation

The water adsorption of the Cu-SCR catalyst prepared according to Comparative Example 3 was determined as described in Reference Example 5 and said water adsorption was of 2.6 g/in³ by weight/volume. The iron impregnation was performed under the same ambient conditions defined in 1) of Reference Example 5. An aqueous solution of 100 g deionized water and 17.85 g iron nitrate nonahydrate (Fe (III)NO₃ 9H₂O) was prepared. The Cu-SCR catalyst prepared according to Comparative Example 3 was then dipped into the aqueous iron nitrate solution at a desired zone length (33% and 100%—see Table 2 below) for 30 seconds before being removed from the solution. Each catalyst was subsequently dried in air for 1 h at 120° C. to remove the excess water and subsequently calcined for 1 h at 590° C.

TABLE 3

| | Cu content (wt.-%*) | Zeolitic material | Fe content (wt.-%**) | Fe zone length (%) | Total wash-coat loading (g/in³) |
|---|---|---|---|---|---|
| Example 3.1 | 3.42 | BEA (SAR: 26:1) | 1.1 | 33 | 2.11 |
| Example 3.2 | 3.42 | BEA (SAR: 26:1) | 1.63 | 100 | 2.12 |

*Cu content, calculated as CuO, in weight-% based on the weight of the zeolitic material.
**Fe content, calculated as Fe₂O₃, in weight-% based on the weight of the zeolitic material.

Example 4 Testing of the Catalysts of Examples 2 and 3 and of Comparative Examples 2 and 3—NOx Conversion and N₂O Formation a) Fe/Cu-SCR—FER The catalysts of Examples 2.1 and 2.2 and of Comparative Example 2 were tested under fresh conditions.
SCR Testing Conditions:
Space velocity (SV)=80 k h⁻¹, Temperatures: 500° C.
Standard SCR Gas feed: 900 ppm NH₃, 750 ppm NO, 10% H₂O, 10% O₂
The results were displayed in FIGS. 4 and 5. FIG. 4 summarize the results obtained under the standard SCR gas feed conditions. As may be taken from FIG. 4, the NOx conversion level of the comparative example 2 was of about 90% at 500° C., while the NOx conversion the performance of Examples 2.1 and 2.2 is better, namely with a NOx conversion of about 92-93% at the same temperature. Further, as may be taken from FIG. 5, the catalysts of Examples 2.1 and 2.2 also exhibits lower nitrous oxide formation compared to the catalyst of the comparative example. Indeed, such formation is at least reduced by a factor 2. Thus, it is clear from said results that the new catalyst manufacturing concept has shown that flexible Fe containing zones are possible and that the advantage of adding Fe to the comparative example 2 will lead to an improvement in NOx conversion, in particular at high temperatures, and significant decrease in N₂O make.
b) Fe/Cu-SCR—BEA
The catalysts of Examples 3.1 and 3.2 and of Comparative Example 3 were tested under fresh conditions.
SCR Testing Conditions:
Space velocity (SV)=80 k h⁻¹, Temperatures: 250, 500° C.

Standard SCR Gas feed: 900 ppm NH₃, 750 ppm NO, 10% H₂O, 10% O₂
The results were displayed in FIGS. 6 and 7. FIG. 6 summarize the results obtained under the standard SCR gas feed conditions at 250 and 500° C. As may be taken from FIG. 6, the NOx conversion level of the comparative example 3 of about 91% at 250° C. and of about 91% at 500° C., while the NOx conversion the performance of Examples 3.1 and 2.2 is better at 500° C. and of about 85-88.5% at 250° C. Further, as may be taken from FIG. 7, the catalysts of Examples 3.1 and 3.2 also exhibits lower nitrous oxide formation, ranging from 24-30 ppm compared to the catalyst of the comparative example (34 ppm). Thus, it is clear from said results that the new catalyst manufacturing concept has shown that flexible Fe containing zones are possible and that the advantage of adding Fe to the comparative example 3 will lead to improved or similar NOx conversion and significant decrease in N₂O make.

CITED LITERATURE

Figure 1A:
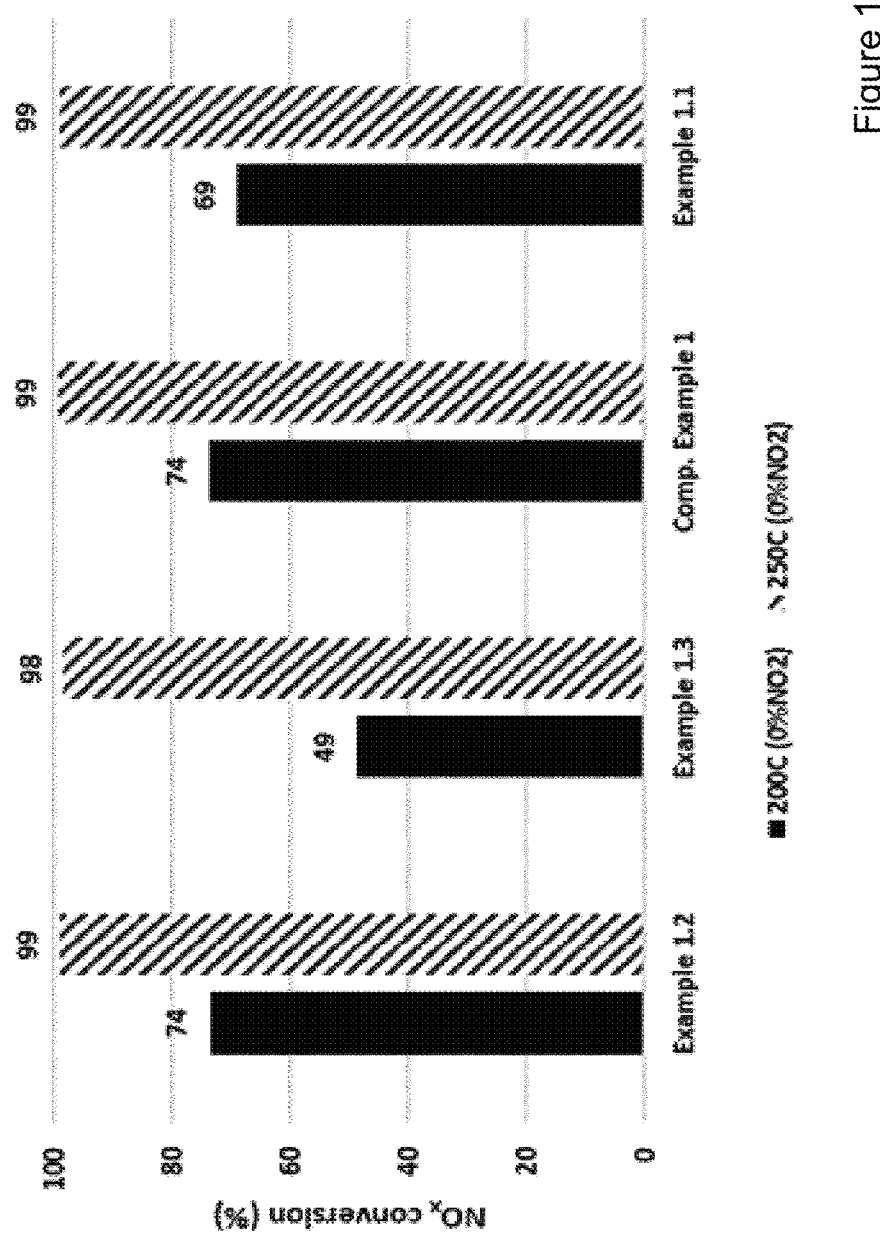
FIG. 1a shows the NOx conversions obtained with the catalysts of Examples 1.1, 1.2, 1.3 and Comparative Example 1 under the standard SCR feed conditions.
Figure 1B:
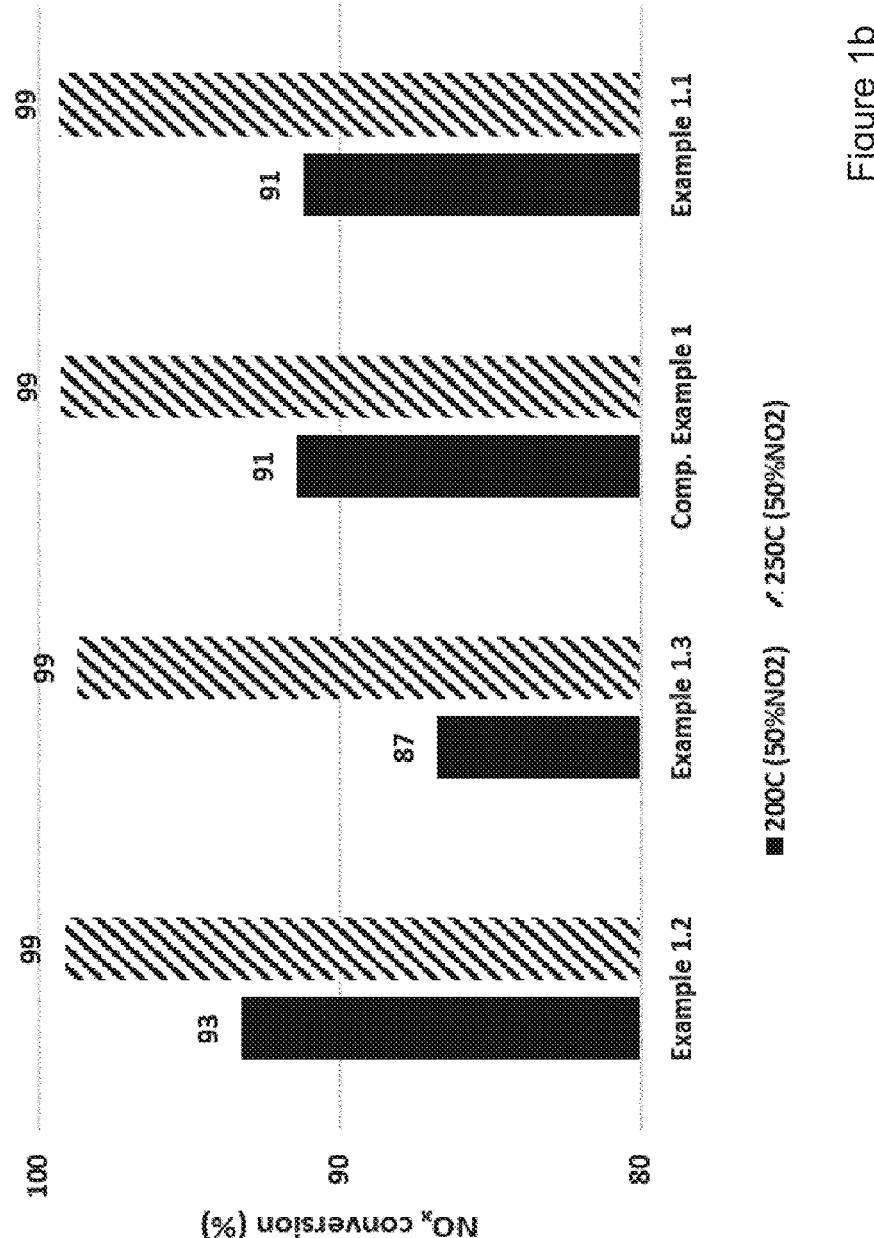
FIG. 1b shows the NOx conversions obtained with the catalysts of Examples 1.1, 1.2, 1.3 and Comparative Example 1 under the fast SCR feed conditions.
Figure 2A:
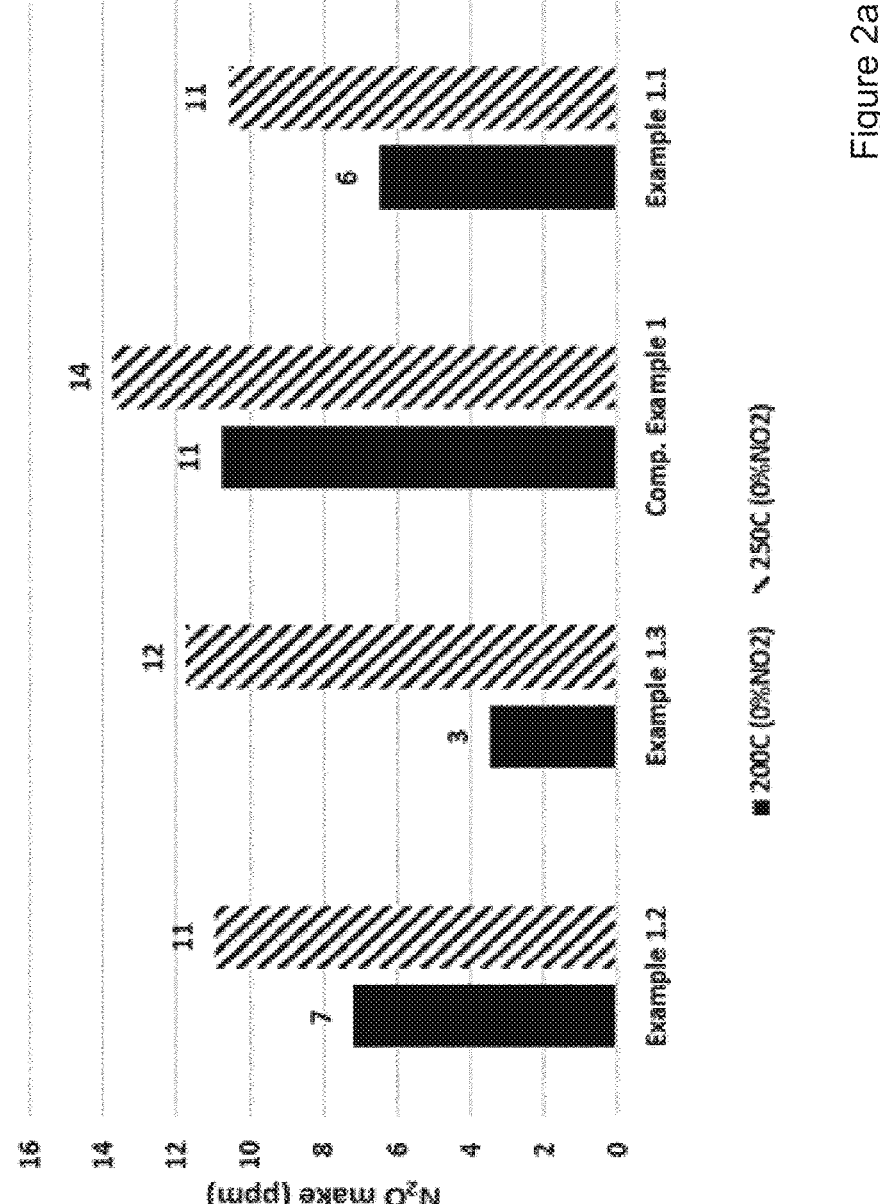
FIG. 2a shows the N₂O formation obtained with the catalysts of Examples 1.1, 1.2, 1.3 and Comparative Example 1 under the standard SCR feed conditions.
Figure 2B:
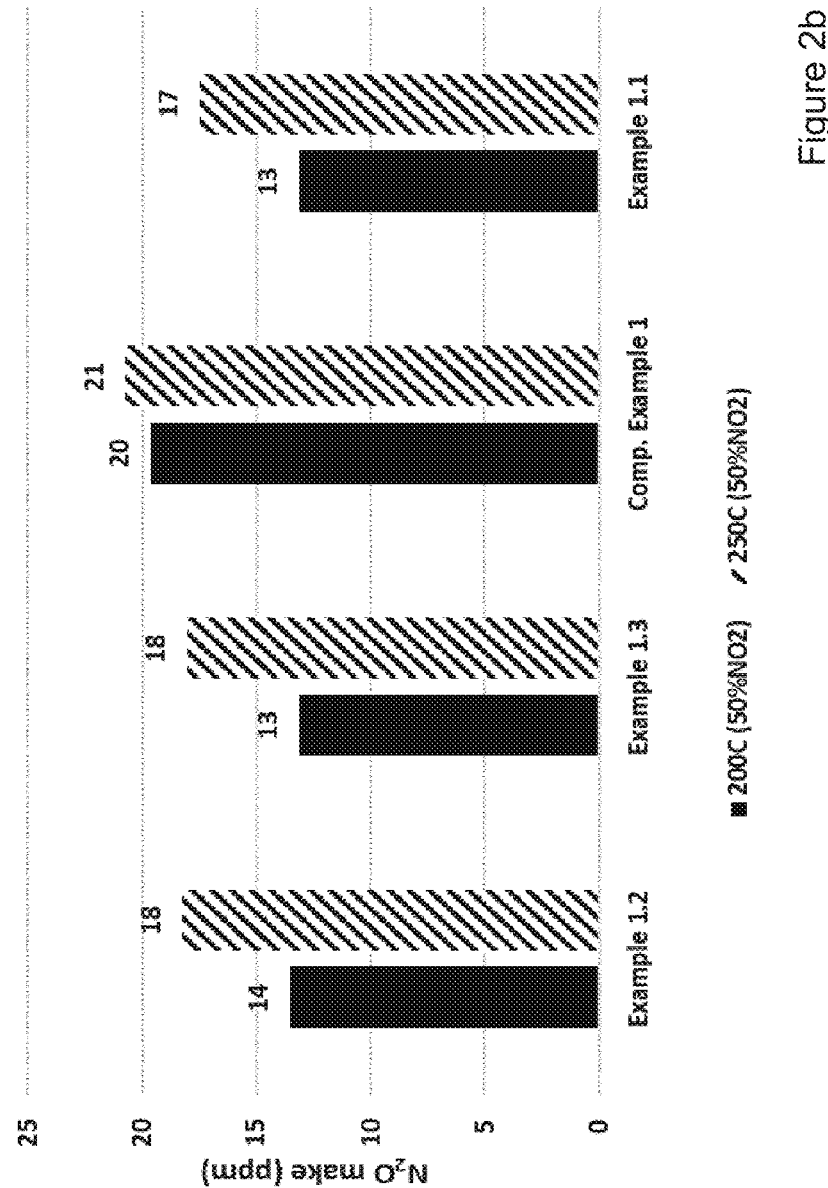
FIG. 2b shows the N₂O formation obtained with the catalysts of Examples 1.1, 1.2, 1.3 and Comparative Example 1 under the fast SCR feed conditions.
Figure 3:
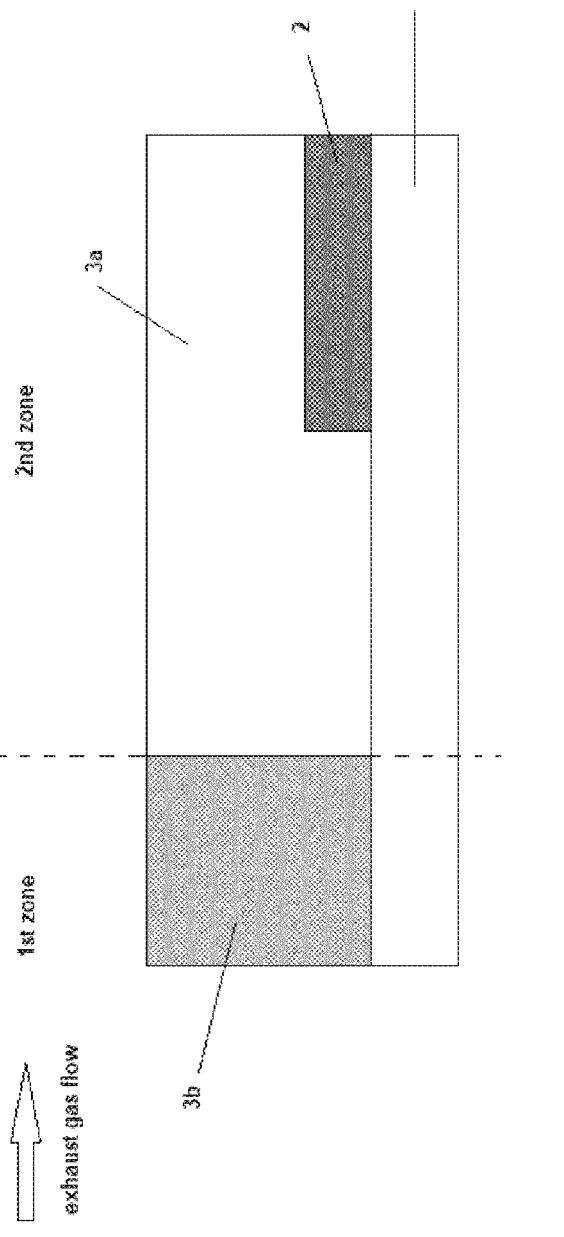
FIG. 3 shows a schematic representation of an exhaust gas treatment catalyst according to the second set of embodiments. The represented catalyst comprises a substrate 1, preferably a flow-through substrate, coated by a first coating 2, an ammonia oxidation coating, preferably comprising platinum on alumina, and by a second coating 3 (3a+3b), wherein the portion 3a comprises a zeolitic material comprising copper and the portion 3b comprises iron and a zeolitic material comprising copper. The portion 3b forms a first zone of the catalyst and a second zone of the catalyst comprises the portion 3a. The first coating is within the second zone.
Figure 4:
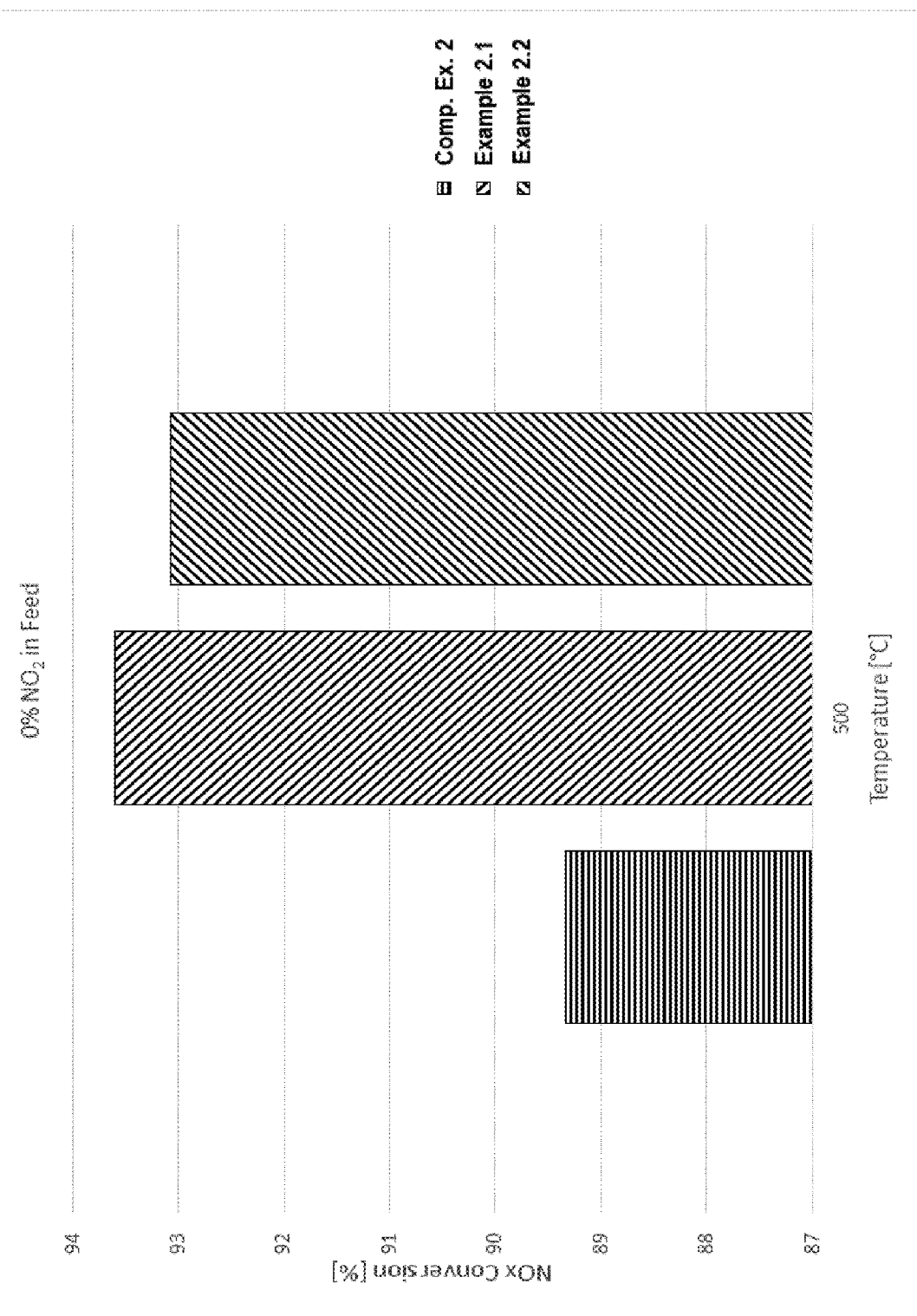
FIG. 4 shows the NOx conversions obtained with the catalysts of Examples 2.1, 2.2 and of Comparative Example 2 under the standard SCR feed conditions.
Figure 5:
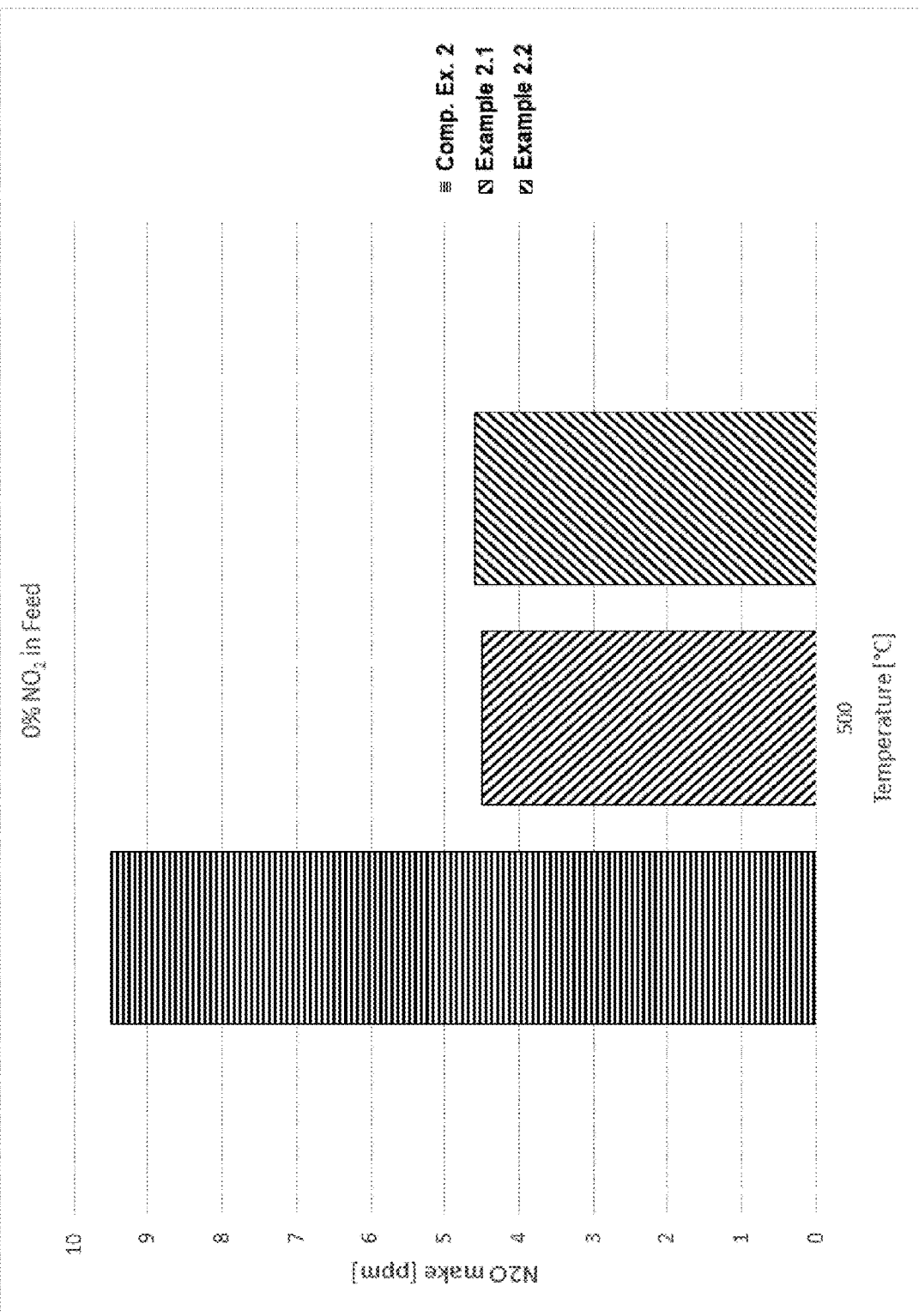
FIG. 5 shows the N₂O formation obtained with the catalysts of Examples 2.1, 2.2 and of Comparative Example 2 under the standard SCR feed conditions.
Figure 6:
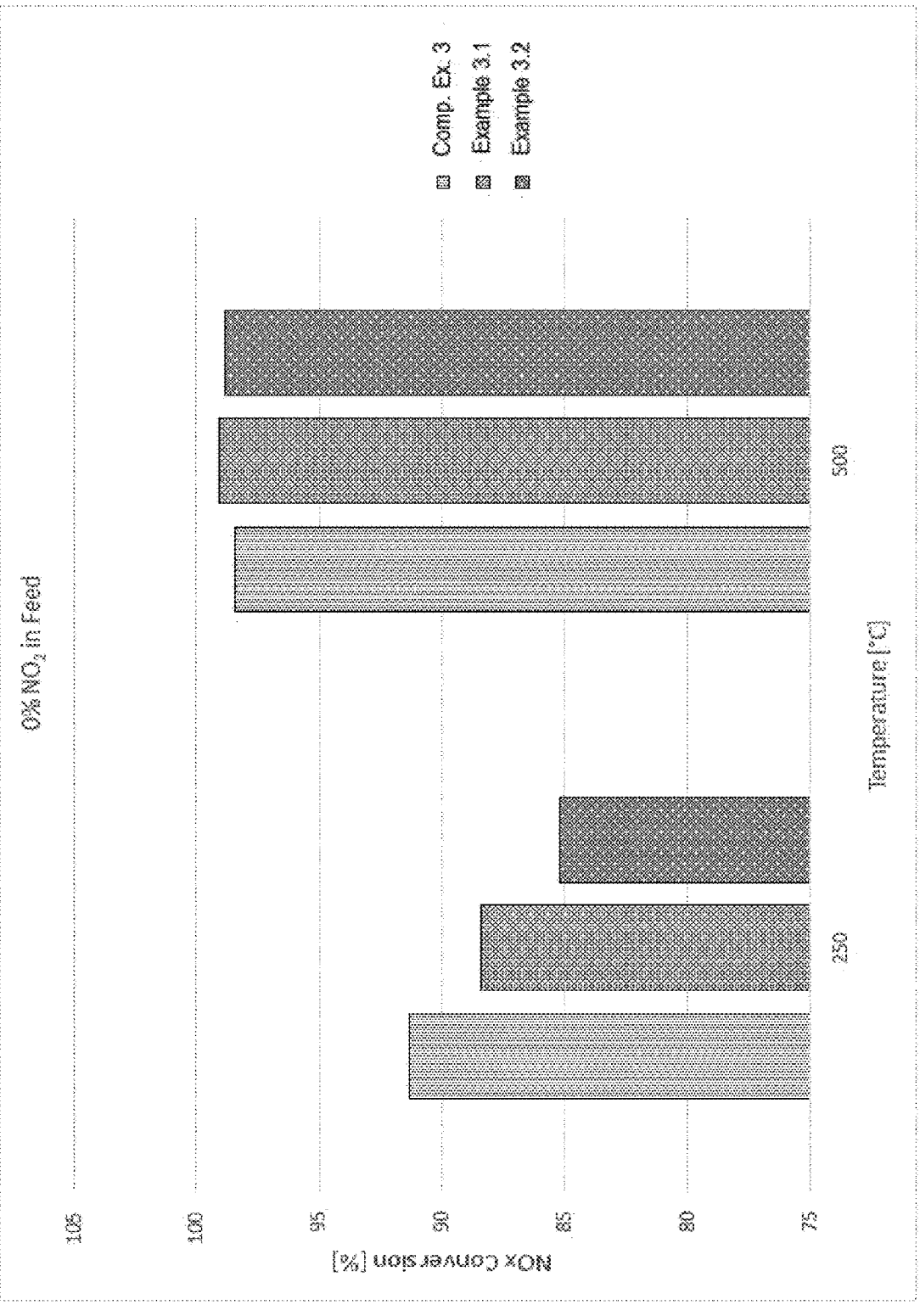
FIG. 6 shows the NOx conversions obtained with the catalysts of Examples 3.1, 3.2 and of Comparative Example 3 under the standard SCR feed conditions.
Figure 7:
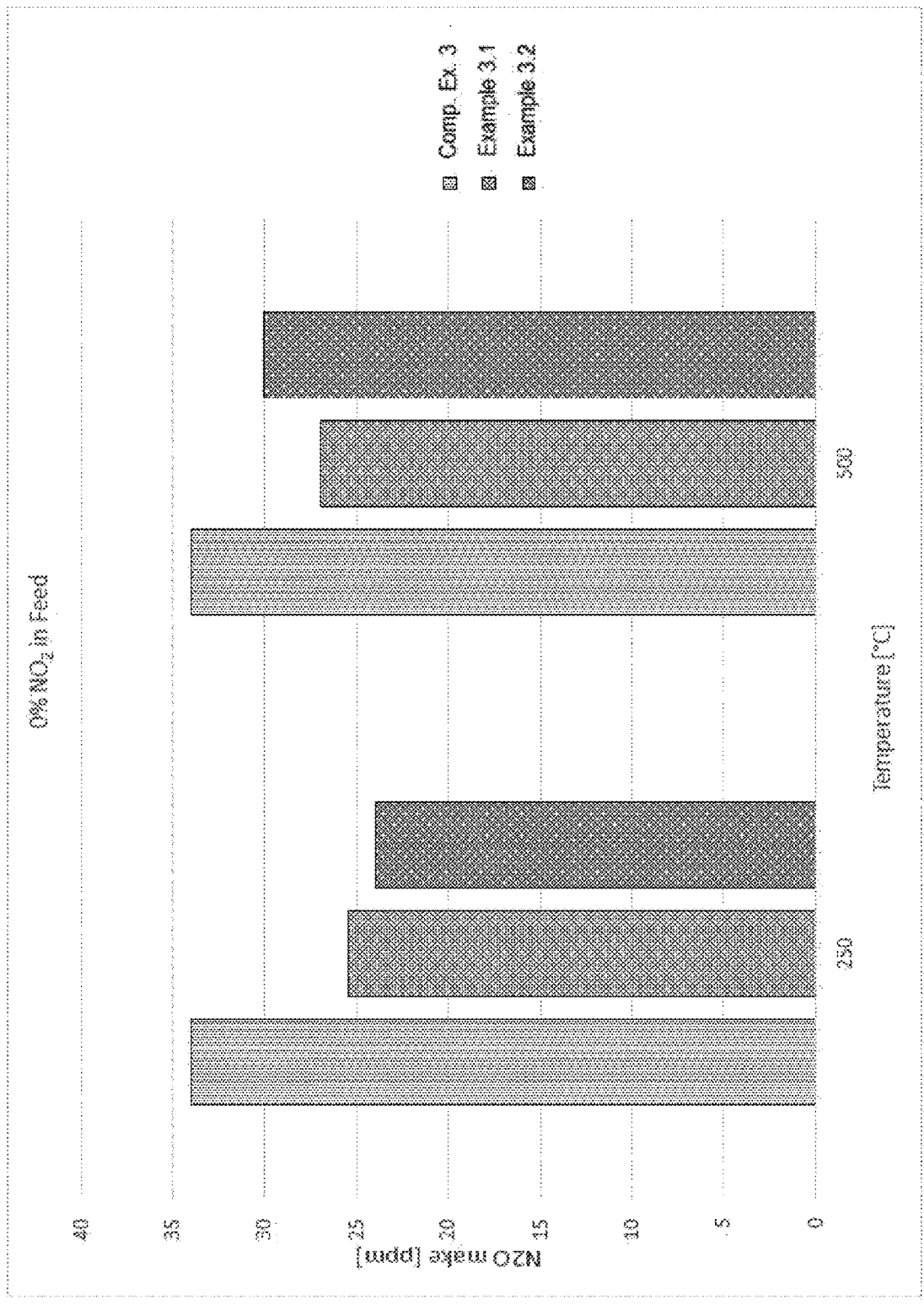
FIG. 7 shows the N₂O formation obtained with the catalysts of Examples 3.1, 3.2 and of Comparative Example 3 under the standard SCR feed conditions.

US 2011/0305614 A1
WO 2016/070090 A1
WO 2017/153894 A1

The invention claimed is:

1. A process for preparing a catalyst for a selective catalytic reduction of nitrogen oxide comprising a coating comprising iron and a zeolitic material comprising copper, the process comprising:
   (i) preparing a first aqueous mixture comprising water and a zeolitic material comprising copper;
   (ii) disposing the first aqueous mixture obtained according to (i) to a substrate, wherein the substrate comprises an inlet end, an outlet end, a substrate axial length extending from the inlet end to the outlet end and a plurality of passages defined by internal walls of the substrate extending therethrough, and over x % of the substrate axial length from the inlet end to the outlet end of the substrate, wherein x ranges from 80 to 100; calcining the substrate having the first aqueous mixture disposed thereon, obtaining a substrate comprising a coating comprising a zeolitic material comprising copper;
   (iii) preparing a second aqueous mixture comprising only water and an iron salt;
   (iv) disposing only the second aqueous mixture obtained according to (iii) on the substrate obtained according to (ii) over y % of the substrate axial length from the inlet end to the outlet end of the substrate, wherein y ranges from 10 to x, obtaining a substrate comprising, in a first zone, the coating comprising a zeolitic material comprising copper and over y of the substrate axial length the iron salt; and, if x>y, in a second zone extending from y % to x of the substrate axial length from the inlet end to the outlet end, the coating comprising the zeolitic material comprising copper, wherein the iron salt is one or more of iron (III) nitrate, iron (II) acetate, ammonium iron (III) citrate, iron (II) sulfate, and iron (II) oxalate, wherein (iv) is performed by dipping the substrate obtained according to (ii) into the second aqueous mixture prepared in (iii); and
   (v) calcining the substrate obtained according to (iv).

2. The process of claim 1, wherein the zeolitic material comprising copper in the first aqueous mixture prepared according to (i) has a framework type selected from the group consisting of CHA, AEI, RTH, LEV, DDR, KFI, ERI, AFX, a mixture of two or more thereof, and a mixed type of two or more thereof.

3. The process of claim 1, wherein the zeolitic material comprising copper in the aqueous mixture prepared according to (i) has a framework type selected from the group consisting of FER, BEA, MFI, FAU, MOR, a mixture of two or more thereof, and a mixed type of two or more thereof.

4. The process of claim 1, wherein the first aqueous mixture prepared according to (i) comprises at most 1000 ppm of iron, calculated as elemental iron.

5. The process of claim 1, wherein calcining the substrate having the first aqueous mixture disposed thereon according to (ii) is performed in a gas atmosphere having a temperature ranging from 400° C. to 800° C.

6. The process of claim 1, wherein the substrate comprising the coating comprising a zeolitic material comprising copper obtained according to (ii) has a water adsorption, expressed in weight of $H_2O$ relative to the volume of the coating, ranging from 1 $g/in^3$ to 5 $g/in^3$.

7. The process of claim 1, wherein the second aqueous mixture prepared according to (iii) comprises the iron salt in an amount, calculated as $Fe_2C>3$, which ranges from 4 weight-% to 40 weight-%, based on the weight of the second aqueous mixture prepared according to (iii).

8. The process of claim 1, wherein y ranges from 20 to x.

9. The process of claim 1, wherein (iv) is performed by dipping the substrate obtained according to (ii) into the second aqueous mixture prepared in (iii) for 5-120 seconds.

10. A catalyst for a selective catalytic reduction of nitrogen oxide prepared by the process of claim 1.

11. The catalyst of claim 10, wherein the zeolitic material comprising copper in the coating has a framework type selected from the group consisting of CHA, AEI, RTH, LEV, DDR, KR, ERI, AFX, a mixture of two or more thereof, and a mixed type of two or more thereof; or wherein the zeolitic material comprising copper has a framework type selected from the group consisting of FER, BEA, MF, FAU, MOR, a mixture of two or more thereof, and a mixed type of two or more thereof.

12. The catalyst of claim 10, wherein the amount of copper, calculated as CuO, comprised in the zeolitic material in the coating ranges from 1.5 weight-% to 15 weight-%, based on the weight of the zeolitic material comprised in the coating.

13. The catalyst of claim 10, wherein the coating comprised in the first zone comprises the iron salt in an amount ranging from 0.5 weight-% to 3.5 weight-%, based on the weight of the zeolitic material.

14. The catalyst of claim 10, wherein x>y.

15. An exhaust gas treatment system for the treatment of exhaust gas exiting from an internal combustion engine, the system comprising:
   a catalyst for a selective catalytic reduction of nitrogen oxide according to claim 10 and
   one or more of a diesel oxidation catalyst, an ammonia oxidation catalyst, a selective catalytic reduction catalyst, a catalyzed soot filter, and a SCR/AMOx catalyst.

16. An exhaust gas treatment catalyst comprising:
   an ammonia oxidation catalyst disposed over z % of the substrate axial length, from the outlet end to the inlet end of the substrate, wherein z ranges from 5 to 100; and
   the catalyst for a selective catalytic reduction of nitrogen oxide prepared by the process of claim 1.

17. The catalyst of claim 16, wherein z ranges from 8 to 50.

18. The catalyst of claim 16, wherein the ammonia oxidation catalyst comprises a platinum group metal component, wherein the platinum group metal component is one or more of platinum, palladium, rhodium, osmium, and iridium.

* * * * *